United States Patent
Hildreth et al.

(10) Patent No.: US 12,017,276 B2
(45) Date of Patent: Jun. 25, 2024

(54) SELF-TERMINATING ETCHING INTERFACES USING IODINE-BASED CHEMISTRIES

(71) Applicant: Colorado School of Mines, Golden, CO (US)

(72) Inventors: Owen Hildreth, Lakewood, CO (US); Meredith Heilig, Golden, CO (US); Sanaz Yazdanparast, Golden, CO (US); Subbarao Raikar, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 17/697,814

(22) Filed: Mar. 17, 2022

(65) Prior Publication Data

US 2022/0297190 A1    Sep. 22, 2022

Related U.S. Application Data

(60) Provisional application No. 63/162,391, filed on Mar. 17, 2021.

(51) Int. Cl.
*B22F 10/62* (2021.01)
*B22F 10/40* (2021.01)
(Continued)

(52) U.S. Cl.
CPC ............ *B22F 10/62* (2021.01); *B22F 10/40* (2021.01); *B22F 10/68* (2021.01); *B33Y 40/20* (2020.01);
(Continued)

(58) Field of Classification Search
CPC .......... B22F 10/62; B22F 10/40; B22F 10/68; B22F 2301/052; B22F 2301/10;
(Continued)

(56) References Cited

U.S. PATENT DOCUMENTS

2017/0306501 A1* 10/2017 Jeon .................. H01L 21/32134
2019/0314895 A1* 10/2019 Hildreth .................... C25F 3/00
(Continued)

FOREIGN PATENT DOCUMENTS

| WO | WO 2017/143005 | 8/2017 |
| WO | WO 2017/143013 | 8/2017 |
| WO | WO 2018/013178 | 1/2018 |

OTHER PUBLICATIONS

Davis et al., "Chapter 1: Basic Understanding of Weld Corrosion," In Corrosion of Weldments, ASM International, 2006, retrieved from https://www.asminternational.org/documents/10192/1849770/ACFAB86.pdf, 10 pages.
(Continued)

*Primary Examiner* — Rebecca Janssen
(74) *Attorney, Agent, or Firm* — Sheridan Ross P.C.

(57) ABSTRACT

A method is provided to remove a selective amount of material from a metal component fabricated by additive manufacturing in a self-terminating manner. The method can be used to remove support structures and trapped powder from a metal component as well as to smooth surfaces of a 3D printed metal component. In some embodiments, selected surfaces of the metal component are treated to make the selected surfaces at least one of mechanically and chemically unstable. The unstable portion of the metal support can then be removed chemically, electrochemically, or through vapor-phase etching. The method can be used for processing any fluid or vapor-accessible regions and surfaces of a 3D printed metal component.

7 Claims, 17 Drawing Sheets

(51) Int. Cl.
*B22F 10/68* (2021.01)
*B33Y 40/20* (2020.01)
*C23F 1/12* (2006.01)
*C23F 3/02* (2006.01)

(52) U.S. Cl.
CPC .................. *C23F 1/12* (2013.01); *C23F 3/02* (2013.01); *B22F 2301/052* (2013.01); *B22F 2301/10* (2013.01); *B22F 2301/15* (2013.01); *B22F 2301/205* (2013.01)

(58) Field of Classification Search
CPC ............ B22F 2301/15; B22F 2301/205; B22F 2999/00; B22F 10/64; B33Y 40/20; C23F 1/12; C23F 3/02; C23F 1/16; C23F 1/18
See application file for complete search history.

(56) References Cited

U.S. PATENT DOCUMENTS

2021/0138552 A1  5/2021  Hildreth et al.
2021/0170493 A1  6/2021  Hildreth

OTHER PUBLICATIONS

Hildreth et al., "Dissolvable Metal Supports for 3D Direct Metal Printing," 3D Printing and Additive Manufacturing, vol. 3, No. 2, 2016, pp. 90-97.

Izumi et al., "Sulfidation properties of TiAl-2 at.% X (X=V, Fe, Co, Cu, Nb, Mo, Ag and W) alloys at 1173 K and 1.3 Pa sulfur pressure in an H2S—H2 gas mixture," Intermetallics, vol. 8, No. 8, Aug. 2000, pp. 891-901. Abstract Only.

Lefky et al., "Dissolvable Metal Supports for Printed Metal Parts," Proceedings of the 27th Annual International Solid Freeform Fabrication Symposium—An Additive Manufacturing Conference Reviewed Paper, 2016, pp. 1604-1610.

Lefky et al., "Dissolvable Supports in Powder Bed Fusion-Printed Stainless Steel," 3D Printing and Additive Manufacturing, vol. 4, No. 1, 2017, pp. 2-11.

Lefky et al., "Impact of compositional gradients on selectivity of dissolvable support structures for directed energy deposited metals," Acta Materialia, vol. 153, Jul. 2018, pp. 1-7. Abstract only.

Official Action for U.S. Appl. No. 17/247,275, dated May 19, 2022, 6 pages. Restriction Requirement.

Official Action for U.S. Appl. No. 17/247,275, dated Dec. 13, 2022, 8 pages.

Izumi et al., "Sulfidation properties of TiAl-2 at.% X (X=V, Fe, Co, Cu, Nb, Mo, Ag and W) alloys at 1173 K and 1.3 Pa sulfur pressure in an H2S—H2 gas mixture," Intermetallics, vol. 8, No. 8, Aug. 2000, pp. 891-901.

Lefky et al., "Impact of compositional gradients on selectivity of dissolvable support structures for directed energy deposited metals," Acta Materialia, vol. 153, Jul. 2018, pp. 1-7.

Official Action for U.S. Appl. No. 17/247,275, dated Jul. 26, 2023, 8 pages.

* cited by examiner

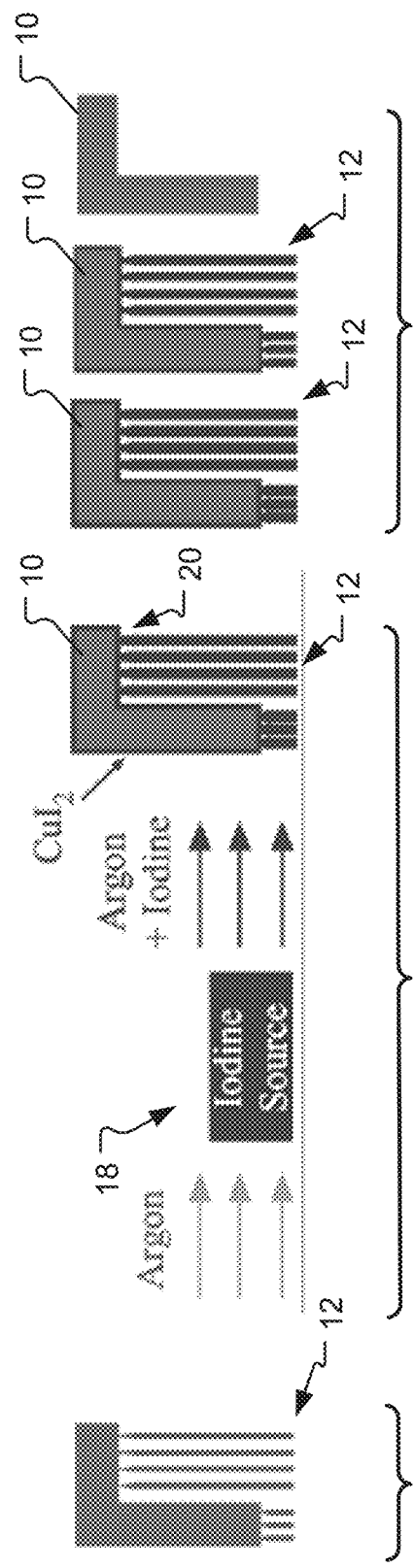

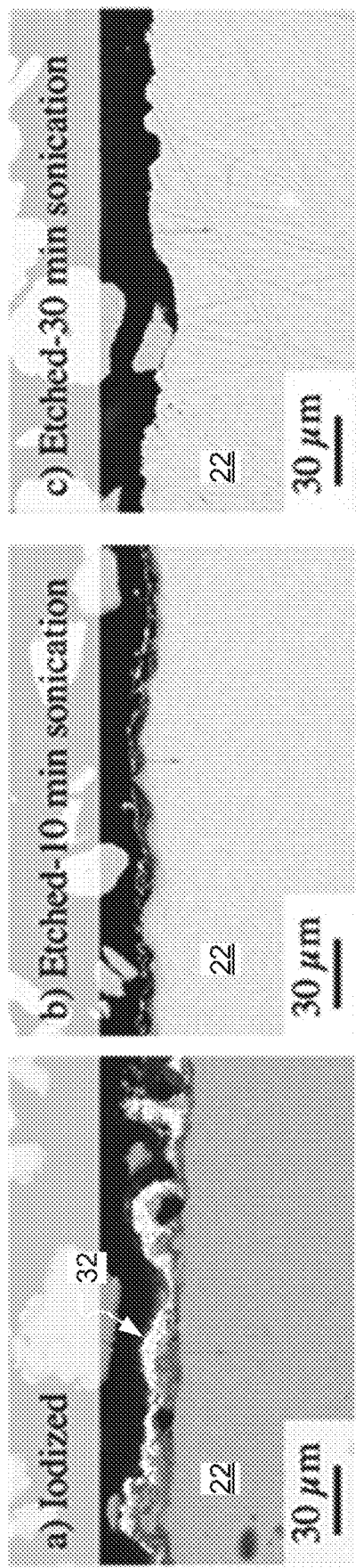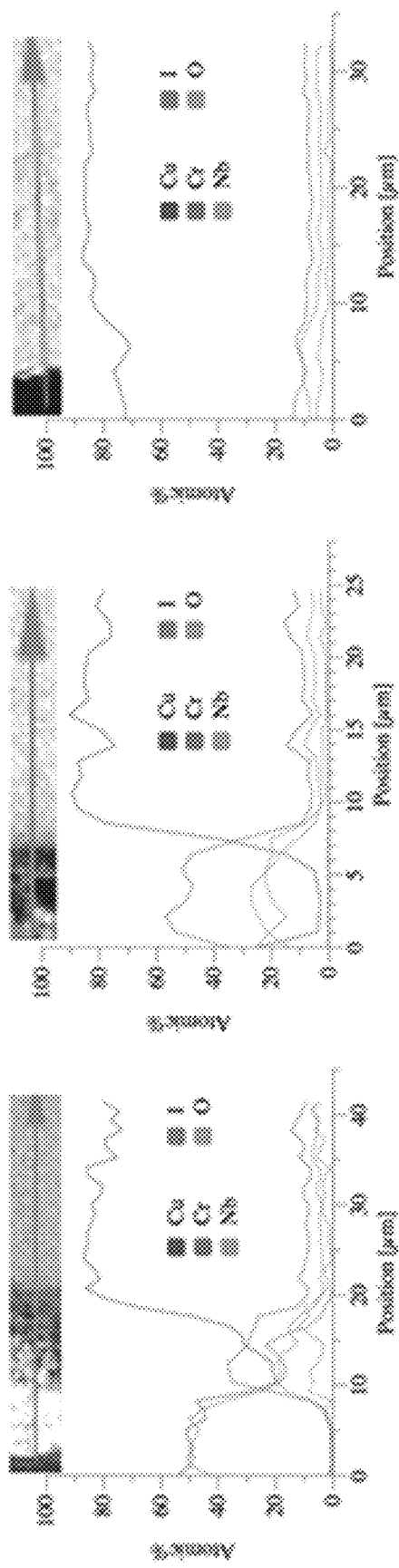
FIG. 10A  FIG. 10B  FIG. 10C

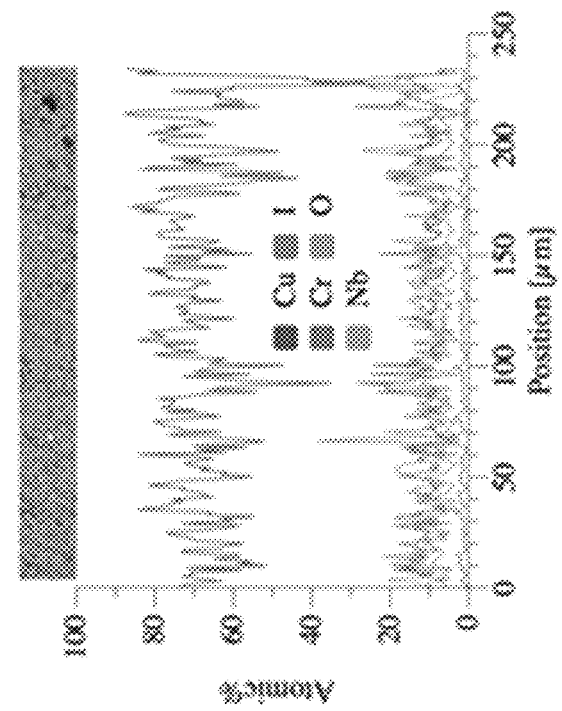
FIG. 11A
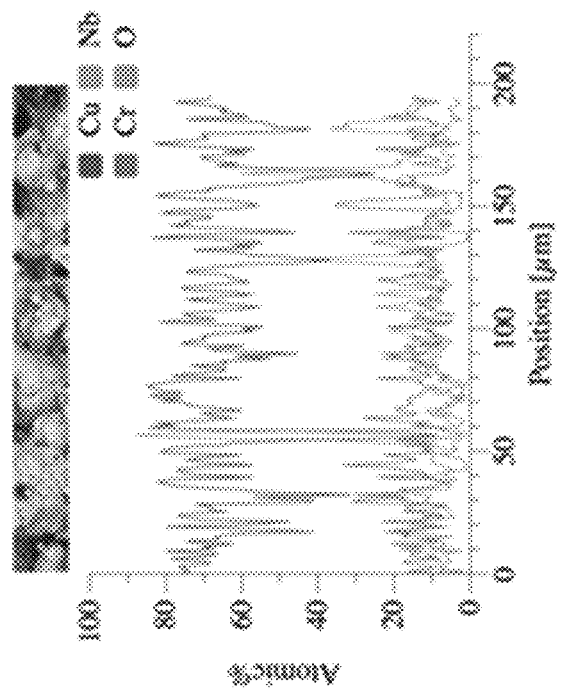
FIG. 11B

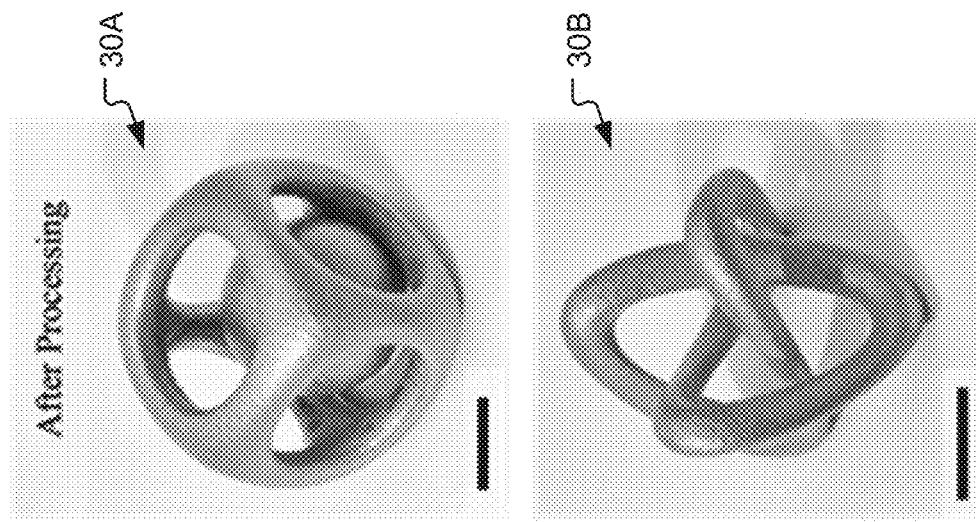
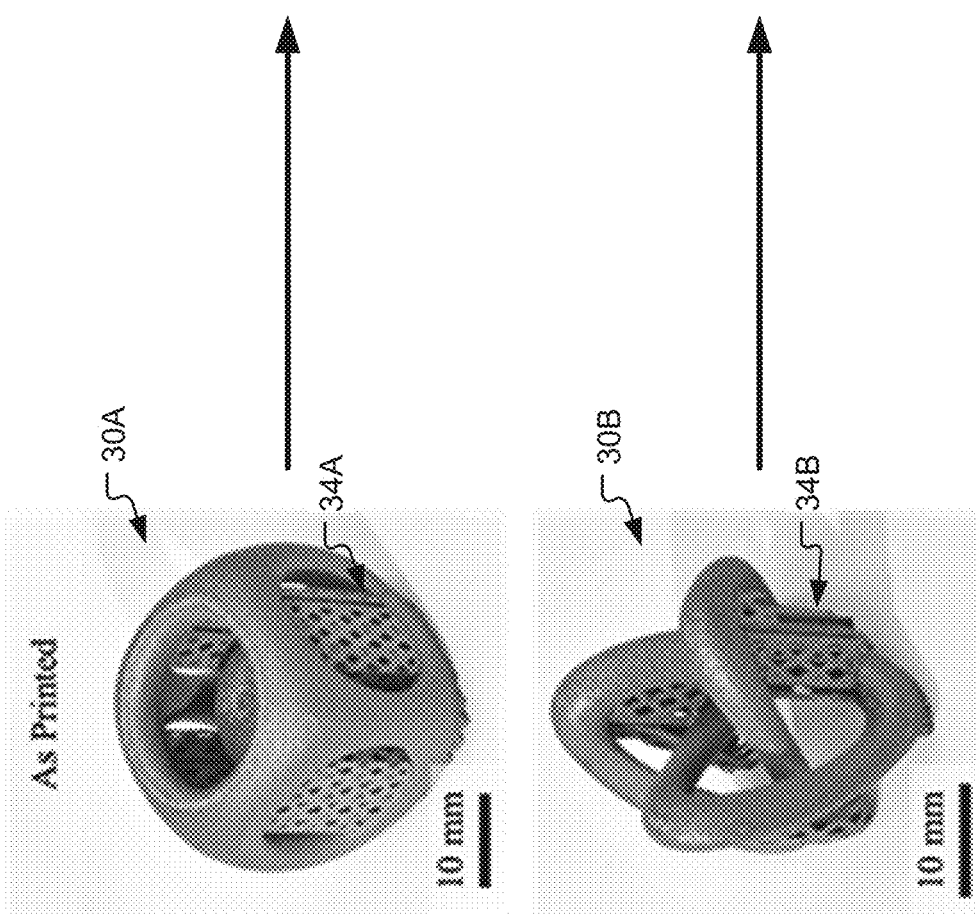
FIG. 13A
FIG. 13B

SELF-TERMINATING ETCHING INTERFACES USING IODINE-BASED CHEMISTRIES

CROSS REFERENCE TO RELATED APPLICATIONS

This application claims priority to U.S. Provisional Application No. 63/162,391, filed on Mar. 17, 2021, and entitled "Self-Terminating Etching Interfaces Using Iodine-Based Chemistries", the entirety of which is hereby incorporated by reference.

GOVERNMENT LICENSE RIGHTS

This invention was made with government support under grant 1944516 awarded by the National Science Foundation and grant 19-EPA-RQ-XX awarded by the Air Force Research Laboratory. The government has certain rights in the invention.

FIELD

This disclosure relates to additive manufacturing. More specifically, methods of fabricating a metal component by additive manufacturing and of removing a selective amount of material from the metal component are provided.

BACKGROUND

Additive manufacturing of metal components is projected to be a $10 billion to $20 billion per year industry by 2025. However, metal components fabricated by additive manufacturing require a significant amount of post-production processing. Post-production processing is expensive and accounts for 30% to 70% of the cost of metal components produced by additive manufacturing. Current processes of finishing metal components produced by additive processing also add unwanted complexity to the design and fabrication of 3D printed metal components, limiting the unprecedented design freedom offered by additive manufacturing.

For example, a metal component fabricated by additive manufacturing typically includes support structures that must be removed. Traditional, monolithic support structures are made from the same material as the metal component. Machining operations are used to remove the support structures from the metal component. The machining operations add significant expense to the cost of the metal component.

The design of the metal component is also limited due to the post-production machining operations. More specifically, the metal component must be designed so that the support structures are accessible to tools or workers for removal from the metal component during post-production processing. This accessibility requirement limits the types of shapes that can be fabricated by additive manufacturing. In addition, features may need to be fabricated on or added to the metal component or the support structure for the metal component to be held and manipulated while support structures are being removed.

Post-production processing of a 3D printed metal component can also include removing metal powder used in the additive manufacturing process that is trapped within an internal space of the metal component. Removing the trapped metal powder can be very difficult. For example, it may be difficult to access the internal space of the metal component that includes trapped metal powder.

Surfaces of the metal component may also need to be smoothed during post-production processing. Traditionally, processes such as machining, bead blasting, sand blasting, and vibratory mechanical polishing have been used to finish metal components fabricated by additive manufacturing. However, these processes have several deficiencies. None of these processes are self-terminating and may inadvertently remove more of the metal component than intended or necessary. These processes can also damage the metal component. Moreover, these finishing processes cannot remove supports and trapped powder from internal features.

Accordingly, there is an unmet need for a method of finishing a metal component fabricated by additive manufacturing that can reduce or eliminate the cost and deficiencies of traditional post-production processing methods and thus reduce capital expenditures and design limitations imposed by traditional post-production processing methods. There is also a need for a simplified method of post-production processing of a metal component fabricated by additive manufacturing that does not sacrifice integrity of the metal component.

SUMMARY

The methods, systems, and apparatuses described herein simplify the post-processing of metal components and supports made by an additive manufacturing process where the post-processing includes removing the support from the rest of the metal component. The metal component can comprise copper or a copper alloy such as GRCop-84, GRCop-42, or an alloy that comprises copper, chromium, and/or niobium. In other embodiments, the metal component may comprise any metal that forms with iodine such as, but not limited to, stainless steel, Inconel, nickel base alloys (e.g., Haynes 282), titanium, or aluminum. Then, the outer layer of the metal component and support is sensitized to change the composition of the outer layer, and an etchant removes the outer layer to separate the support from the rest of the metal component and reduce the roughness of a surface of the metal component. The sensitizing agent and/or etchant can be applied in a gaseous, fluid, gel, or solid state to coat all surfaces of a metal component independent of geometric complexity.

It is an aspect of embodiments of the present disclosure to manufacture the metal component and support via additive manufacturing such as a 3D printing process. In some embodiments, the additive manufacturing process is a powder-bed 3D printer, or the additive manufacturing process may comprise powder bed sintering, selective laser sinter, selective laser melting, directed energy deposition and the like. The support may comprise the bulk material, a dissolvable microstructure or a mechanically weak microstructure. After the metal component is formed, the support can be separated from the rest of the metal component with a process as described herein. Further, the process may be used to finish a surface of the metal component. For example, the process can be used to reduce surface roughness, remove surface defects, and remove trapped powder. Additionally, the process can be used to manufacture controllably thin printed features such as, for example, fins on a heat exchanger. Such features may be initially printed at a first thickness, then the process may be used to thin the feature to a second thickness less than the first thickness.

It is another aspect of embodiments of the present disclosure to provide a method for applying the sensitizing agent to the metal component and support to change an outer layer of the metal component and support. As stated above, the sensitizing agent can be applied in a gaseous state or liquid state, and thus, the sensitizing agent flows over the outer surface of the metal component and support. The sensitizing agent forms a sensitized region or portion of the metal component, particularly the outer surface of the metal component. More specifically, the sensitizing agent treats, leeches, degrades, weakens, and/or alters metal material or chemical composition of the metal component. The sensitizing agent is selected to alter one or more of the chemical composition and microstructure of the metal component to make the outer layer or other part of the metal component less mechanically and/or chemically stable. In some embodiments, the sensitizing agent is applied to all of the metal component. In various embodiments, the sensitizing agent is applied to a selected portion of the metal component, such as a support. In further embodiments, the metal component includes an aperture or access point to facilitate treating a portion of the metal component or the support with a sensitizing agent.

In various embodiments, the method may include baking the metal component to induce the change or sensitization of the outer layer or other part of the metal component and support. In some embodiments, the metal component can be baked in an oven at a temperature of between approximately 30° C. and 900° C. The term "approximately" can mean a variation of +/−10% on a relative basis. The metal component can be baked for a duration of between approximately 20 to 1200 minutes. In some embodiments, the metal component is baked after the sensitizing agent is applied. Alternatively, the sensitizing agent can be applied to the metal component as the metal component is baked.

In some embodiments, the sensitizing agent includes a halide such as iodine or iodine complexes to sensitize, treat, and/or alter the surface of the metal component. For example, the sensitizing agent may comprise, but is not limited to, elemental iodine, iodine solutions, iodine salts, iodine organics potassium iodide, povidone-iodine, iohexol, amidotrizoate, meglumine iotroxate, iopanoic acid, amiodarone, radioactive iodine, aqueous iodine, an iodine tincture, atomic iodine, or the like. The halide material diffuses in material of the metal component to form halide complexes in a region near the surface of the metal component. These complexes can include copper iodide, chromium iodide, niobium iodide, titanium iodide, aluminum iodide, nickel iodide, tungsten iodide, neodymium iodide, lead iodide, tin iodide, silver iodide, gold iodide, or any other metal-iodide complexes. In some embodiments, the iodine reacts with a metal material (e.g., a copper material, a stainless steel material, an Inconel material, a nickel based alloy, a titanium material, an aluminum material, etc.) to form iodine complexes in a region to a predetermined depth of the metal material. These iodine complexes are soluble in various etchants as described herein. In further embodiments, differences in the diffusion rate of the various elements within the copper material results in variations in the composition near the surface of the copper material. These post-iodized composition differences near the surface can be exploited to selectively dissolve the sensitized region under conditions that do not dissolve material of the copper material that are not sensitized by the iodine of the sensitizing agent.

It is one aspect of embodiments of the present disclosure is to reduce levels of copper oxide, chromium oxide, and other oxides in the sensitized region of the metal component and support. These oxides can include $Cr_2O_3$ and $NbO_2$ and are generally insoluble, which can inhibit the etching process to remove the sensitized region and separate a support from the rest of a metal component. To address this oxidation issue, the process for sensitizing the metal component and support and/or the process for removing the sensitized region in the metal component and support can be conducted in an environment with an inert atmosphere. In some embodiments, the environment can include argon gas, nitrogen gas, etc. In addition, the etchant itself can be deaerated to remove air from the etchant prior to being applied to the sensitized region to reduce the formation of oxides. Further still, a heat treatment of the metal component and support prior to application of the sensitizing agent can also reduce the formation of oxides. In some embodiments, the metal component and support are subjected to an elevated temperature for a predetermined time period to reduce the formation of oxides in subsequent processes such as forming and then removing the sensitized region of the metal component and support.

It is an aspect of embodiments of the present disclosure to provide a method of forming the metal component to control the exposure of the metal component to the sensitizing agent to sensitize material of the metal component to a predetermined depth. Accordingly, the material of the metal component is sensitized, treated, or chemically altered to a depth of less than approximately 500 μm, or less than approximately 100 μm. The sensitized region of the metal component may be formed to a depth of between approximately 0.5 μm and approximately 5,000 μm. Deeper portions of the metal component remain chemically inert.

Because the surface of the metal component (i.e., only regions exposed to both the sensitizing agent and heat) is sensitized only to a predetermined depth, the sensitized portion of the metal component can be removed to a specific, controllable depth. In this manner, the sensitized portion forms a natural "etch stop" to prevent removal or damage to deeper, untreated regions of the support or the metal component. The sensitized portion can be selectively dissolved without dissolving the deeper, chemically inert portions of the metal component. For example, the sensitized portion can be formed to be susceptible to corrosion from a broad range of electrolytes or acidic solutions. In this manner, the support can be removed from the metal component without mechanical machining operations and without compromising the underlying layer of the metal component.

Once part of the metal component is changed with the sensitizing agent, this part of the metal component can be removed with, for example, an etchant to separate a support from the rest of the metal component. The etchant used to dissolve halide complexes formed in the copper material or metal material is acetonitrile, polar solvents (e.g., water, isopropanol, methanol, etc.), and/or solutions of dissolved iodide. For example, chromium (III) iodide readily dissolves in solutions containing chromium (II) iodide. Further, in some embodiments, iodine salts may added to the etchant to accelerate the etchant. The etchant does not react with the underlying metal material and enables the process to be self-terminating, geometry agnostic, and easy to implement. Accordingly, the method of the present disclosure can be used to improve the surface finish of a 3D printed metal component. In some embodiments, the resulting surface roughness in terms of arithmetic mean roughness, $R_a$, is less than 30 μm. In various embodiments, $R_a$ is less than 10 μm. In some embodiments, $R_a$ is less than 2 μm.

The depth of the sensitized region can also be established as a function of the geometry of, for example, the support that is separated from the rest of the metal component. A cross section of a given connection between a support and the rest of the metal component can be characterized by a separation dimension, which is the dimension or depth from an outer perimeter of the connection that a sensitized region needs to extend such that dissolution of the sensitized region causes a compete separation of the part and the support. An etchant is applied to the outer perimeter to dissolve the sensitized region, and the etchant moves inwardly from all sides. Thus, for a connection with a circular cross section, the etchant reaches the center of the circular cross section of the connection from all sides simultaneously. As a result, the etchant needs to dissolve to a depth equal to a radius of the circular shape, and the separation dimension is equal to the radius of the circular shape.

Various processes can be used as an alternative to, or in combination with, an etchant to remove the sensitized portion including, but not limited to: chemical dissolution, electrochemical dissolution, thermal evaporation, thermal stressing, thermal cracking, stress corrosion, cracking, mechanical strain, mechanical deformation, sanding, sand (or bead) blasting, and other processes known to those of skill in the art. In some embodiments, additives, chelating agents, complexing agents, accelerating agents, and/or inhibiting agents can be added to a chemical bath to promote dissolution of a sensitized portion of the metal component. In some embodiments, additives, chelating agents, complexing agents, accelerating agents, and/or inhibiting agents can be added to the chemical bath to increase the solubility of the sensitized portion of the metal component. In various embodiments, a sensitized portion of the metal component can be exposed to a predetermined etchant solution that will selectively etch the sensitized portion with acceptable (i.e. low) etch rate for material of the metal component. In some embodiments, an additive can be added to the etchant to passivate or protect non-sensitized portions of the metal component. The etchant may include an additive selected to make sensitized portions of the metal component susceptible to chemical or electrochemical dissolution. In some embodiments, the etchant includes an additive selected to alter a rate at which sensitized portions of the metal component chemically and/or electrochemically dissolve. In various embodiments, the sensitizing agent is a leeching agent. The sensitizing agent may include an electrolyte, and the sensitizing agent may also include complexing agents. In some embodiments, the sensitizing agent may comprise at least one of elemental iodine, iodine solutions, iodine salts, iodine organics potassium iodide, povidone-iodine, iohexol, amidotrizoate, meglumine iotroxate, iopanoic acide, amiodarone, radioactive iodine, aqueous iodine, an iodine tincture, or atomic iodine.

When applied to the metal component, the sensitizing agent degrades the metal component to form a sensitized portion. More specifically, the sensitizing agent may at least one of leech, deplete, and degrade material or chemical composition of the metal component to a predetermined depth. This may include forming a precipitate, grain boundary attaching/weakening, an intra-grain attaching, dissolution, alloying, intermetallic alloying, and similar processes. In various embodiments, the sensitizing agent is selected to increase corrosion susceptibility of surfaces of the metal component.

In various embodiments, an additive may be added to the sensitizing agent. In some embodiments, a first additive can be used to improve passivation of material of the metal component. Additionally, or alternatively, a second additive can be used to selectively remove passivation of the material of the metal component. For example, a portion of the metal component, such as a sacrificial section, can be exposed to a sensitizing agent including the second additive to sensitize the sacrificial section to facilitate its removal.

In some embodiments, a sensitized portion of the metal component is less chemically stable in an etchant solution than an unsensitized portion of the metal component. Additionally, or alternatively, a sensitized portion of the metal component can be less electrochemically stable in an electrochemical bath than an unsensitized portion of the metal component. In another embodiment, a sensitized portion of the metal component can be less mechanically stable in an etchant solution than an unsensitized portion of the metal component.

The method may include forming multiple types of sacrificial sections that can be formed when the metal component is 3D printed. The sacrificial sections can subsequently be sequentially removed. More specifically, multiple sacrificial sections may be formed to enable sequential removal techniques where one sacrificial section or sacrificial material is removed at a time. For example, a first sacrificial section comprising a first material can be sensitized with a first sensitizing agent. The first sacrificial section can then be removed. In various embodiments, the first sacrificial section is dissolved by a first etching bath.

A second sacrificial section comprising a second material can be sensitized with a second sensitizing agent. Thereafter, the second sacrificial section can be removed from the metal component. The second sacrificial section may be removed by a second etching bath. In this manner, support and/or other sacrificial sections can be removed from the metal component while other portions of the metal component are left for metrology, machining, fixturing, or other process.

The method may also include forming supports with different strengths when the metal component is 3D printed. In some embodiments, this includes forming supports with shapes that are less stable. For example, a first support may have a cross-sectional dimension that is smaller than a second support. Accordingly, after surfaces of the first and second supports have been sensitized, the first support can be dissolved or etched away faster than the second support. In this manner, the first support can be removed and then the removal process can be stopped before the second support is removed. The second support can thus be left in place for some mechanical or structural advantage.

In various embodiments, the metal component includes a support that is entirely dissolvable. Accordingly, after the support is exposed to the sensitizing agent, the entire support can be dissolved. In another embodiment, the metal component includes a support that includes a section that is dissolvable. In this manner, when the section is exposed to the sensitizing agent, only the section will be sensitized. The sensitized section can then be removed while leaving other sections of the support in place. In some embodiments, the metal component may include a support with a variable gradient of support material. More specifically, the support can be formed with a transition of support material that varies across a distance. In this manner, the support can be formed with a porous interface that can be selectively removed from the metal component. Forming a variable gradient can also be used to prevent the sensitizing agent from diffusing into a portion of the metal component. In another embodiment, an interface material can be positioned between a support and a portion of the metal component. The interface material can be selected to promote adhesion, mechanical compliance, or another property beneficial to the metal component. In still another embodiment, a support can be formed that does not extend through the metal component. More specifically, the support may be formed such that once sensitized portions of the support are removed, unsensitized portions of the metal component are left in place.

In some embodiments, a masking or blocking agent is applied to protect a portion of the surface of the metal component from the sensitizing agent. In some embodiments, the method includes applying pressure to the metal component. The method may also include rinsing the metal component after removing the portions of the metal component. In some embodiments, the method may further comprise removing the sensitizing agent. In various embodiments, the sensitizing agent can be removed as part of the heat treatment. In some embodiments, the sensitizing agent can be removed during removal of the sensitized portions of the metal component. In various embodiments, the sensitizing agent is removed by washing the metal component.

One particular embodiment of the present disclosure is a process for separating a support from a part, comprising joining the part and the support at a connection that has a separation dimension from an outer perimeter of the connection, wherein the part and the support comprise a metal material; applying a sensitizing agent to the part and the support proximate to the connection, wherein the sensitizing agent comprises a halide in a gaseous state; heating the part and the support at an elevated temperature to cause the sensitizing agent to diffuse into the part and the support and create a sensitized region, wherein the sensitized region has a depth that is greater than or equal to the separation dimension; and applying an etchant to the sensitized region to dissolve the sensitized region through the separation dimension to separate the support from the part.

In some embodiments, the etchant comprises acetonitrile. In other embodiments, the etchant comprises at least one of polar solvents (e.g., water, isopropanol, methanol, etc.), and/or solutions of dissolved iodide. In various embodiments, the connection has a cross section with a circular shape, and the separation dimension is a radius of the circular shape. In some embodiments, the method further comprises applying the etchant is a self-terminating process such that only the sensitized region is dissolved or a rate of dissolution decreases after the sensitized region is dissolved. In various embodiments, the method further comprises joining the part and a second support at a second connection that has a second separation dimension from an outer perimeter of the second connection, wherein the second separation dimension is larger than the separation dimension, and the sensitized region has a depth that is greater than or equal to the second separation dimension such that dissolution of the sensitized region separates the second support from the part. In some embodiments, at least one of the elevated temperature, a time period for the heating, and a time period for the etching is increased to increase the depth of the sensitized region.

Another particular embodiment of the present disclosure is a self-terminating process for removing a sensitized region of a material, comprising applying a sensitizing agent to a surface of the material, wherein the material is an alloy comprising copper, chromium, and niobium; heating the material at an elevated temperature between approximately 30 and 900° C. for a time period between 20 and 1200 minutes to cause the sensitizing agent to diffuse into the material and create the sensitized region in the material adjacent to the surface; and applying an etchant to the sensitized region to dissolve and remove the sensitized region of the material.

In some embodiments, the material is a part and a support joined at a connection having a separation dimension from an outer perimeter of the connection, wherein the sensitized region has a depth that is greater than or equal to the separation dimension.

A further particular embodiment of the present disclosure is a self-terminating process for removing a sensitized region of a material, comprising applying a sensitizing agent to a surface of the material, wherein the material comprises a copper material, and the sensitizing agent comprises a halide material; heating the material at an elevated temperature between approximately 30 and 900° C. to cause the sensitizing agent to diffuse into the material and create the sensitized region in the material adjacent to the surface, wherein the sensitized region is enriched with iodine; and applying an etchant to the sensitized region to dissolve and remove the sensitized region of the material.

In some embodiments, the copper material comprises copper, chromium, and niobium. In various embodiments, the heating is conducted for between approximately 20 and 1200 minutes. In some embodiments, the sensitized region has a depth between approximately 10 and 200 μm.

The systems and methods of the present disclosure provide many benefits. For example, by using the systems and methods described herein, metal components can be designed which can be produced by additive manufacturing processes without the requirement that support structures must be accessible by machines or mechanical tools for post-production processing. Instead, the present disclosure facilitates the design of metal components in which a sensitizing agent is used treat surfaces after printing the metal component. In this manner, the systems and methods described herein remove design restrictions imposed by prior post-production processing techniques.

The systems and methods of the present disclosure can reduce the costs of post-production processing of metal components formed by 3D printing by 90% to 99% while reducing post-processing time by weeks or even months. Use of the post-production processing systems and methods described herein can save the industry $5 billion to $10 billion per year.

The Summary is neither intended nor should it be construed as being representative of the full extent and scope of the present disclosure. The present disclosure is set forth in various levels of detail in the Summary as well as the Detailed Description and no limitation as to the scope of the present disclosure is intended by either the inclusion or non-inclusion of elements, components, etc. in this Summary. Additional aspects of the present disclosure will become more clear from the Detailed Description.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. In addition, all ranges described herein may be reduced to any sub-range or portion of the range.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Detailed Description, Abstract, and Claims themselves.

It should be understood, of course, that the disclosure is not necessarily limited to the embodiments described herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

BRIEF DESCRIPTION OF THE DRAWINGS

The accompanying drawings, which are incorporated in and constitute a part of the specification, illustrate embodiments of the disclosure and together with the Summary given above and the Detailed Description of the drawings given below, serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

FIGS. 5A-5C are a schematic of a self-terminating etching process in accordance with an embodiment of the present disclosure;

FIG. 10A is a cross-sectional view of an exemplary part that has been sensitized in accordance with an embodiment of the present disclosure;

FIG. 10B is a cross-sectional view of an exemplary part that has been etched and cleaned in accordance with an embodiment of the present disclosure;

FIG. 10C is a cross-sectional view of an exemplary part that has been etched and cleaned in accordance with an embodiment of the present disclosure;

FIG. 11A is a line scan of an exemplary part in accordance with an embodiment of the present disclosure;

FIG. 11B is a line scan of an exemplary part that has been iodized-dissolved and cleaned in accordance with an embodiment of the present disclosure;

FIG. 13A is a side view of a first exemplary part and a second exemplary part as printed in accordance with an embodiment of the present disclosure;

FIG. 13B is a side view of a second exemplary part and a second exemplary part after processing in accordance with an embodiment of the present disclosure.

Figure 1A:
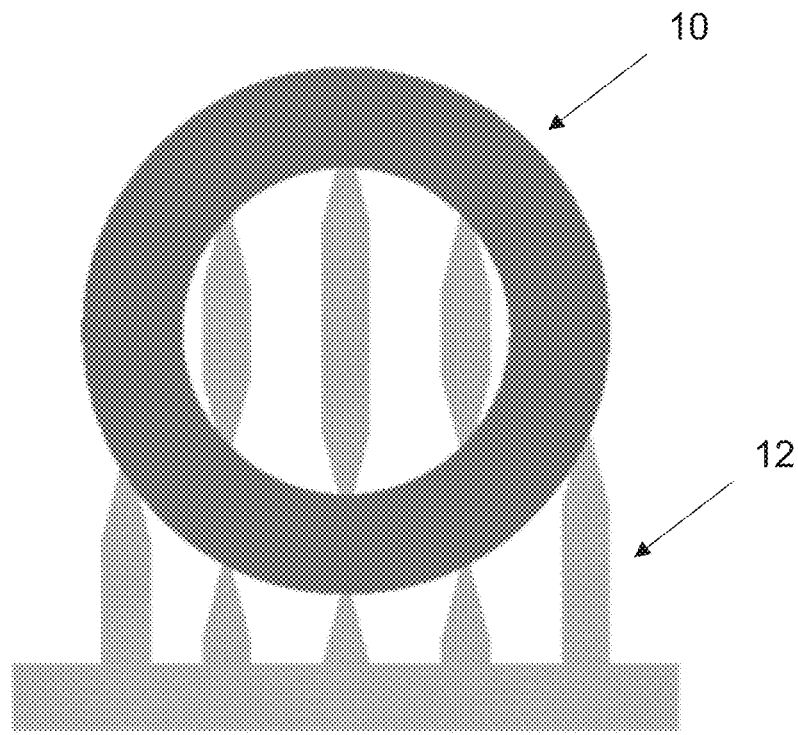
FIG. 1A is a side view of a part and a support created by additive manufacturing or three dimensional (3D) printing according to the prior art.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
|---|---|
| 10 | Part |
| 12 | Support |
| 14 | Connection |
| 16 | Separation Dimension |
| 18 | Sensitizing Agent |
| 20 | Sensitized Region |
| 22 | Copper Alloy |
| 24 | Boundary Region |
| 26 | Sensitized Region |
| 28 | Surface |
| 30A | First Part |
| 30B | Second Part |
| 32 | Oxide Layer |
| 34 | Support Structures |

DETAILED DESCRIPTION

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of the present disclosure will be described herein with reference to drawings that may be schematic illustrations of idealized configurations. Various embodiments of the present disclosure are described herein and as depicted in the drawings. It is expressly understood that although the figures show parts, supports, and systems and processes for processing the same, the present disclosure is not limited to these embodiments. It will be appreciated that terms such as "comprising copper" refer to materials with a composition that has some amount of copper such as pure copper, a copper alloy, etc. It will also be appreciated that terms such as "comprising metal" refer to materials with a composition that has some amount of a metal, whether in a pure form of the metal, an alloy of the metal, etc. This also applies to other materials described herein such as sensitizing agents, etchants, etc. Moreover, terms such as "copper", "copper material", and "copper alloy" can be used interchangeably herein. Further, terms such as "metal", "metal material", and "metal alloy" can be used interchangeably herein. Terms such as "comprises" can mean that a component such as a part, support, sensitizing agents, etchant, etc. at least partially comprises a particular material.

Figure 1B:
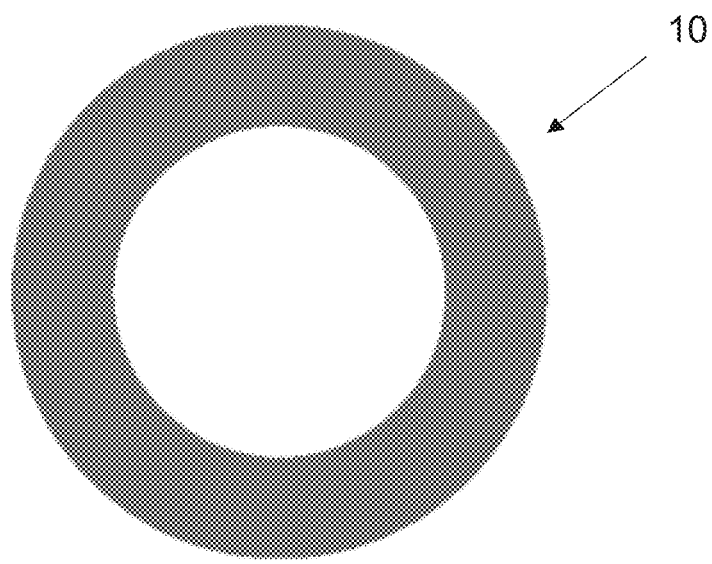
FIG. 1B is a side view of the part in FIG. 1A with the support machined away according to the prior art.

Now referring to FIGS. 1A and 1B, side views of a prior art part 10 and support 12 are provided. In FIG. 1A, the part 10 and support 12 can be additively manufactured where the part 10 is intended to be the final product or device, and the support 12 helps maintain the overall structure of the part 10 as the part 10 and support 12 are manufactured and then allowed to cool. After manufacturing and cooling, the supports 12 are then machined off, cut away, or otherwise removed to leave the part 10 as the final product or device. As discussed above, the tools and machines needed for removing the supports 12 constrain the design of the product since they need access to the supports 12.

Figure 2A:
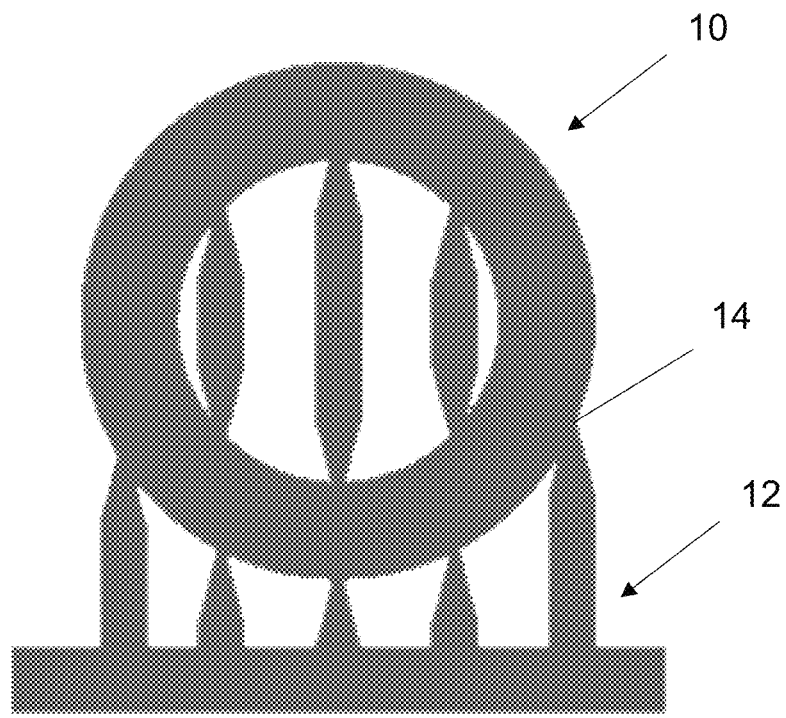
FIG. 2A is a side view of a part and a support in accordance with an embodiment of the present disclosure.

Now referring to FIG. 2A, a side view of a part 10 and support 12 are provided. The part 10 and support 12 can be additively manufactured in a range of configurations and designs that exceed what is possible according to prior art processes due to the above-noted constraints. Additive manufacturing can be performed by a 3D printer, and the process can include powder bed sintering, selective laser sinter, selective laser melting, directed energy deposition, etc. The part 10 and/or the support 12 can be any material that benefits from the disclosure herein. For exemplary purposes, the part 10 and/or the support 12 in various embodiments can be a copper material or alloy. It will be appreciated that in other embodiments, the metal component may comprise any metal that forms with iodine such as, but not limited to, stainless steel, Inconel, nickel base alloys (e.g., Haynes 282), titanium, or aluminum. The process for removing the supports 12 is tailored to the specific type or material or alloy as described in further detail below.

Figure 2B:
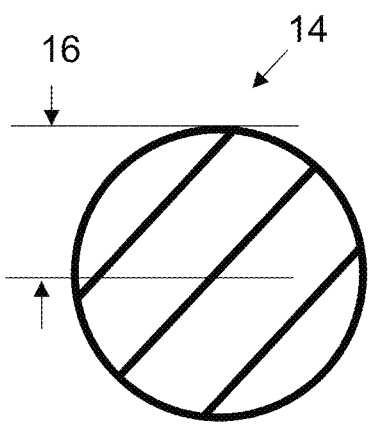
FIG. 2B is a cross-sectional view of a connection between a part and a support in accordance with an embodiment of the present disclosure.
Figure 2C:
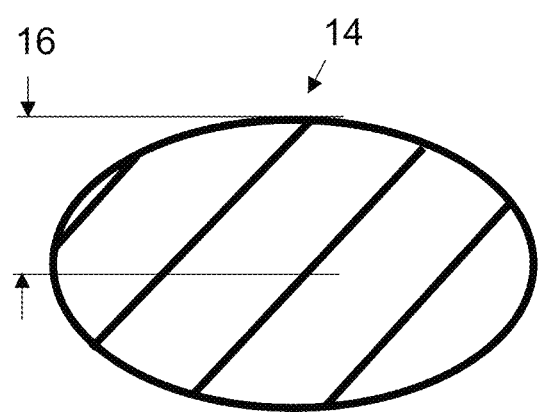
FIG. 2C is a cross-sectional view of another connection between a part and a support in accordance with an embodiment of the present disclosure.
Figure 2D:
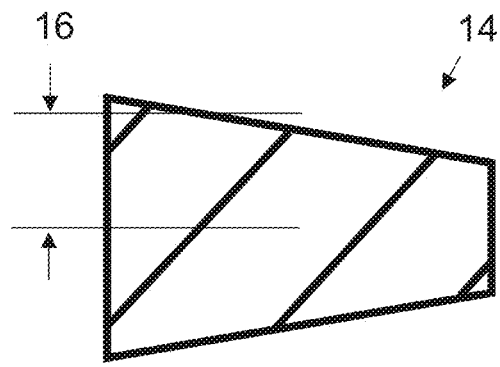
FIG. 2D is a cross-sectional view of a further connection between a part and a support in accordance with an embodiment of the present disclosure.

Now referring to FIGS. 2B-2D, cross-sectional views of a connection 14 between the part 10 and the support 12 are provided. As shown, a cross section of a given connection 14 can be characterized by a separation dimension 16, which is the dimension or depth from an outer perimeter of the connection 14 that a sensitized region needs to extend such that dissolution of the sensitized region causes a compete separation of the part 10 and the support 12. An etchant is applied to the outer perimeter to dissolve the sensitized region, and the etchant moves inwardly from all sides. Thus, for a connection 14 with a circular cross section, like the one shown in FIG. 2B, the etchant reaches the center of the circular cross section of the connection 14 from all sides simultaneously. As a result, the etchant needs to dissolve to a depth equal to a radius of the circular shape, and the separation dimension 16 is equal to the radius of the circular shape.

In FIG. 2C, the separation dimension 16 is the smallest radius of the oval cross-sectional shape. Again, in the case where the entire perimeter of the connection 14 is sensitized, and the etchant is applied to the outer perimeter of the connection 14 and works inward, the etchant only needs to work to the identified dimension 16 before the connection 14 is severed. Etchant that works from the left and right sides need not meet at any point within the cross section because etchant working from the top and bottom sides will meet first and sufficiently dissolve the connection 14.

FIG. 2D shows a connection 14 with a trapezoidal cross sectional shape, and the separation dimension 16 is smaller than half of a length of the left edge of the shape. This is because the etchant dissolves from the top and bottom sides as well as the left side. Accordingly, etchant dissolving from the top left corner and bottom left corner do not need to meet at a midpoint on the left side to dissolve the connection. Rather, the etchant from the top and bottom sides meet the etchant from the left side at a "triple" point that is offset from the left edge to establish the separation dimension 16. Hence, the separation dimension 16 is not half the length of the left edge, but some dimension smaller. The geometric principle of a separation dimension 16 can apply to other components such as a portion of a part or a support.

When a part and various supports are created or printed by, for example, a 3D printer, the geometry of the part and supports is known, and a separation dimension 16 can be determined for each connection between the part and a support or for each support. Then, parameters of the process described herein such as time in a bath of sensitizing agent, time spent at an elevated temperature, the elevated temperature itself, time in a bath of etchant, etc. can be adjusted such that the largest separation dimension 16 is dissolved through and completely separated but no further material is dissolved. Embodiments of the present disclosure also consider that a connection or support can vary in cross-sectional shape along a length of the connection or support. Thus, a goal is first established such as dissolving enough material to separate the part and support or to completely eliminate any connection and support. Then, with the geometries of the connection and supports known, the parameters of the process can be set to achieve the established goal.

In an exemplary embodiment, the geometries of the various connections between the part and the supports are characterized and separation dimensions are established. One connection has a cross sectional shape with a first separation dimension, and another connection has a cross sectional shape with a larger, second separation dimension. The parameters of the process are adjusted and keyed to the second separation dimension to ensure that all connections are completely dissolved through and all supports are separated from the part.

Figure 3A:
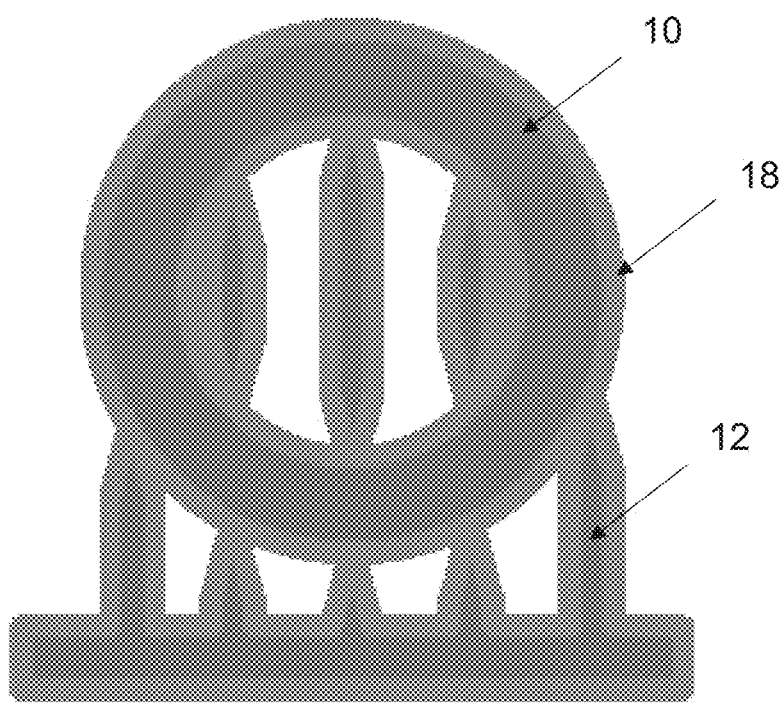
FIG. 3A is a side view of the part and the support of FIG. 2A with a sensitizing agent applied in accordance with an embodiment of the present disclosure.

Referring to FIGS. 3A-3E, various actions that can be performed in an exemplary process of the present disclosure are provided. In FIG. 3A, a sensitizing agent 18 is applied to the part 10 and support 12. In the depicted embodiment, the sensitizing agent 18 is applied over the entire surface of the part 10 and the support 12. However, in other embodiments, the sensitized agent 18 is applied to only a portion of the part 10 and/or support 12 such as the outer surface of the connection between the part 10 and the support 12. In one embodiment, a masking or blocking agent is applied to protect a portion of the surface of the metal part from the sensitizing agent. The sensitizing agent treats, leeches, degrades, weakens, or otherwise alters the composition of the part 10 and the support 12. In some embodiments, the sensitizing agent 18 may be applied in a vapor phase to the part 10 and the support 12. In other embodiments, the sensitizing agent 18 may be applied in a liquid phase or a solid phase. In some embodiments the sensitizing agent 18 is delivered at pressures below atmospheric pressure. In other embodiments, the sensitizing agent 18 is delivered at pressures at or above atmospheric pressure.

Figure 3B:
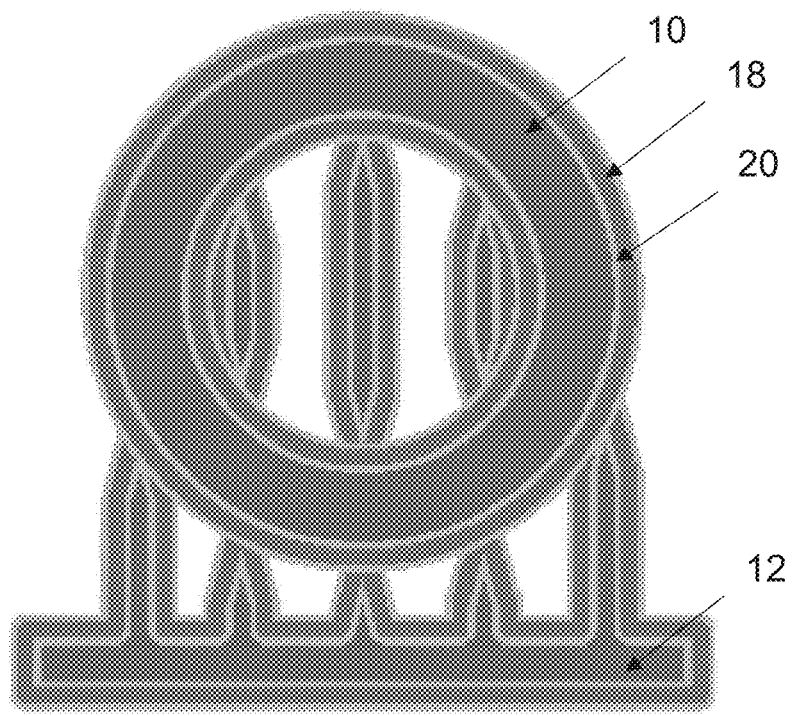
FIG. 3B is a side view of the part and the support of FIG. 3A with a heat treatment to create a sensitized region in accordance with an embodiment of the present disclosure.

Referring to FIG. 3B, the part 10 and the support 12 along with the sensitizing agent 18 are subjected to a heat treatment process. This process can serve to both create a sensitized region and also relieve stresses and refine microstructure in the part material. In some embodiments, the part 10 and support 12 are placed in an oven or other enclosed space with an elevated temperature for a predetermined time period. This heat treatment causes the sensitizing agent 18 to change the composition of the surface of the part 10 and support 12 to create a sensitized region 20 that has a different composition compared to the rest of the part 10 and support 12. It will be appreciated that the actions described herein can be performed in any order and in series or in parallel. For instance, the sensitizing agent 18 can be applied to the part 10 and support 12 while in the oven.

Figure 3C:
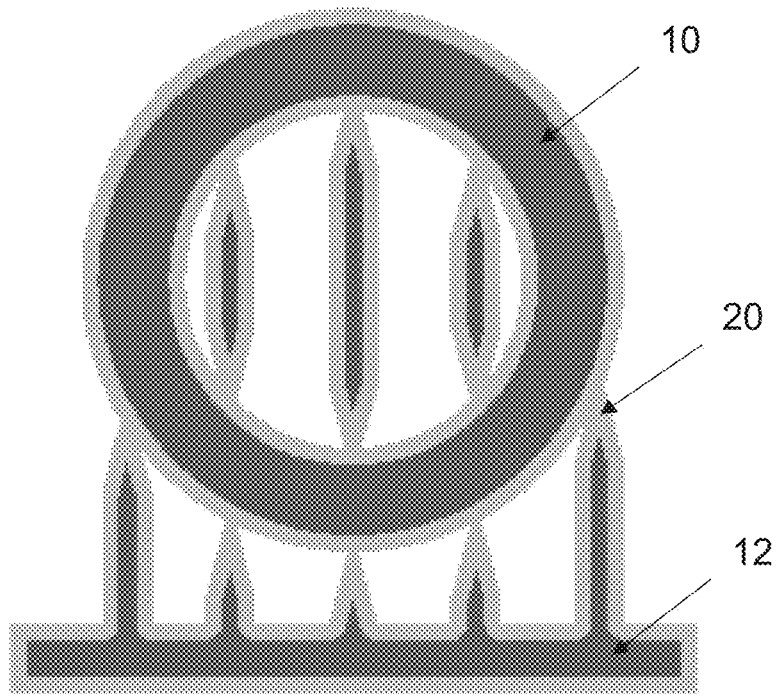
FIG. 3C is a side view of the part and the support of FIG. 3B with the sensitizing agent removed leaving the sensitized region in accordance with an embodiment of the present disclosure.

Referring to FIG. 3C, a side view of a part 10 and support 12 is provided where the part 10 and support 12 have been removed from an oven and excess sensitizing agent has been rinsed away. The resulting part 10 and support 12 have a sensitized region 20 as described above. In some embodiments, the sensitized region 20 has a depth such that at least one cross-sectional portion of the connection between the part 10 and support 12 is completely sensitized, and thus, completely dissolved. The depth of the sensitized region 20 can be characterized in a number of ways. For instance, the depth can be described in terms relative to the physical size of the connection including a separation dimension of the connection as described above. As the sensitizing region 20 needs to extend completely through the connection in some embodiments, the depth of the sensitizing region 20 can be greater than or equal to the separation dimension of the connection.

Figure 3D:
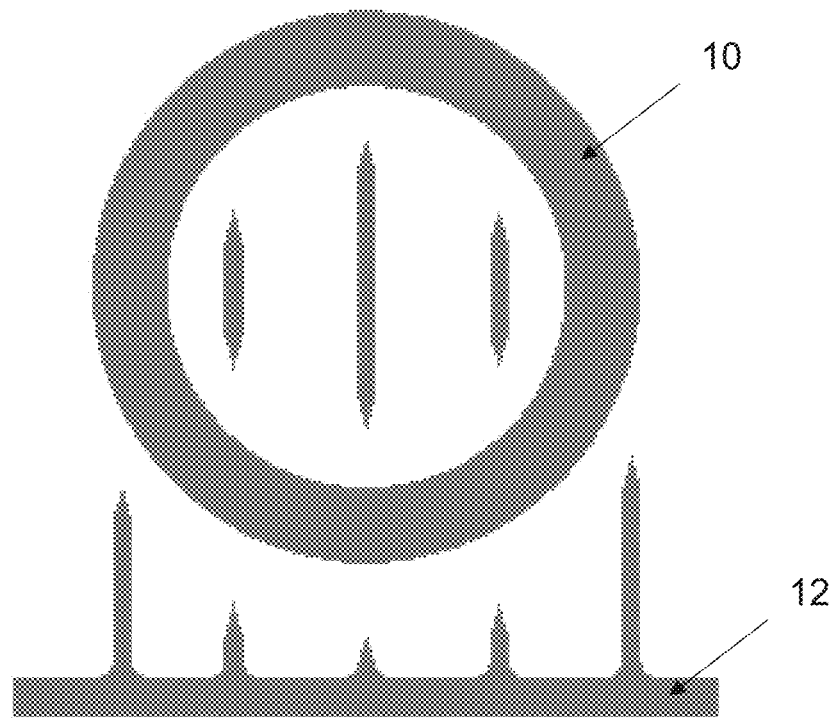
FIG. 3D is a side view of the part and the support of FIG. 3C with an etchant applied that dissolves the sensitized region and the connection between the part and the support in accordance with an embodiment of the present disclosure.
Figure 3E:
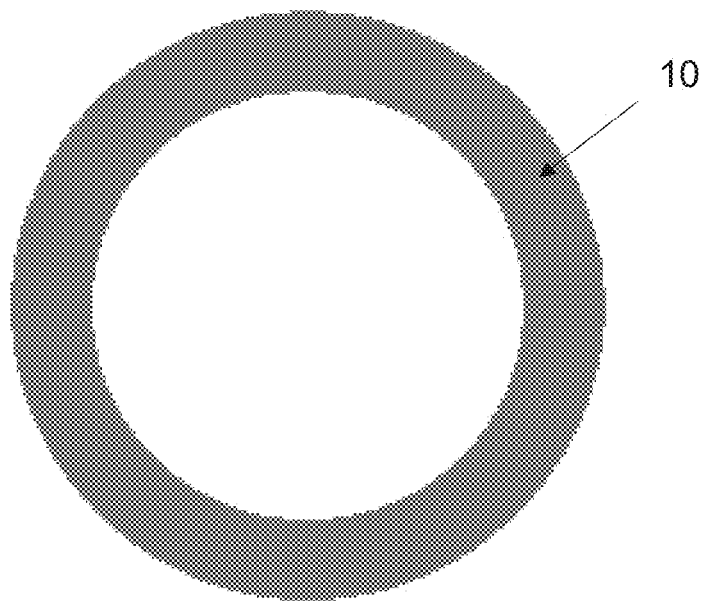
FIG. 3E is a side view of the part in FIG. 3D with the etchant rinsed away leaving only the part in accordance with an embodiment of the present disclosure.

Referring to FIG. 3D, a side view of the part 10 and support 12 is provided where an etchant has been applied to the part 10 and support 12. The etchant is selected to dissolve the sensitized region 20 but not the remaining part material 10, or at least not at the same rate. The result is that the sensitized region 20 in the connection is dissolved such that the support 12 is separable from the part 10. Thus, the designs for the part 10 and the support 12 can be much more complex as the design need to allow only chemicals to react at the connections between the part 10 and the support 12 rather than entire machines. FIG. 3E shows the part 10 with the etchant rinsed away to produce the final product.

Optionally, additives, chelating agents, complexing agents, accelerating agents, and/or inhibiting agents can be added to a chemical bath to promote dissolution of a sensitized portion of the metal part. In one embodiment, additives, chelating agents, complexing agents, accelerating agents, and/or inhibiting agents can be added to the chemical bath to increase the solubility of the sensitized portion of the part. Further still, additives or other materials can be added to the sensitizing agent to increase the passivity of a part material and/or decrease passivity of a support material. In one embodiment, the sensitizing agent is a leeching agent. Optionally, the sensitizing agent can be a fluid. The sensitizing agent may include an electrolyte. The sensitizing agent may also include complexing agents. Optionally, the sensitizing agent is a chemical solution or a gas. The sensitizing agent can be applied to the metal part in a solid phase, a liquid phase, or a vapor phase. Optionally, the sensitizing agent includes Group 1 elements and/or Group 2 elements. Additionally, or alternatively, in one embodiment the sensitizing agent includes Group 17 elements such as iodine. In other embodiments, the sensitizing agent may comprise, but is not limited to, elemental iodine, iodine solutions, iodine salts, iodine organics potassium iodide, povidone-iodine, iohexol, amidotrizoate, meglumine iotroxate, iopanoic acide, amiodarone, radioactive iodine, aqueous iodine, an iodine tincture, atomic iodine, or the like.

Figure 4A:
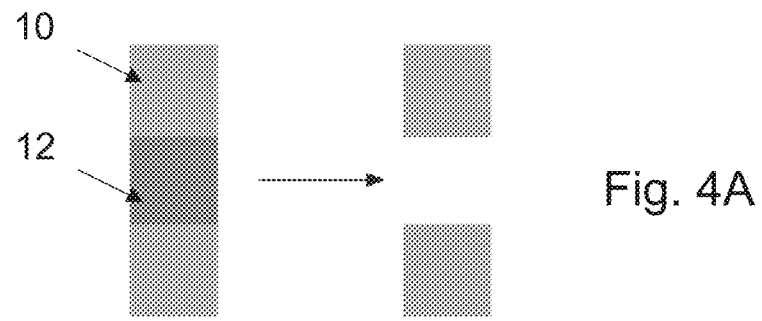
FIG. 4A is a side view of a part and support in accordance with an embodiment of the present disclosure.
Figure 4B:
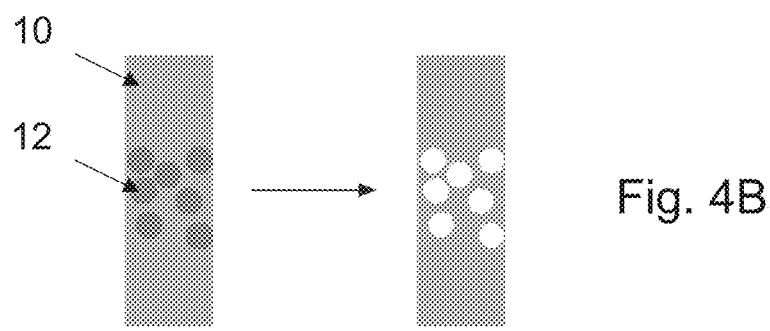
FIG. 4B is a side view of another part and support in accordance with an embodiment of the present disclosure.
Figure 4C:
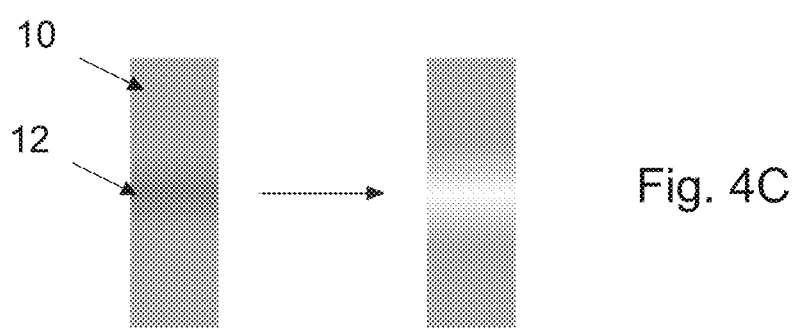
FIG. 4C is a side view of a further part and support in accordance with an embodiment of the present disclosure.
Figure 4D:
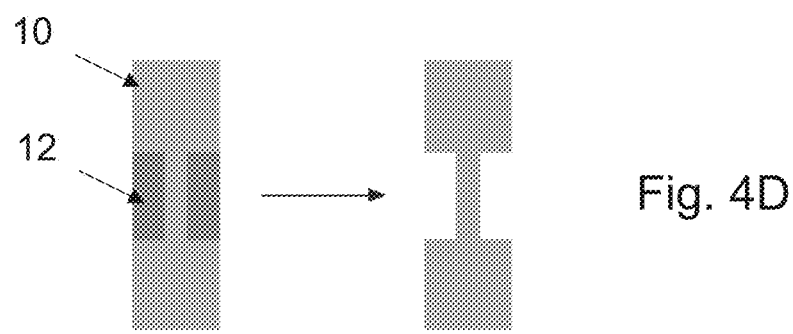
FIG. 4D is a side view of yet another part and support in accordance with an embodiment of the present disclosure.
Figure 6A:
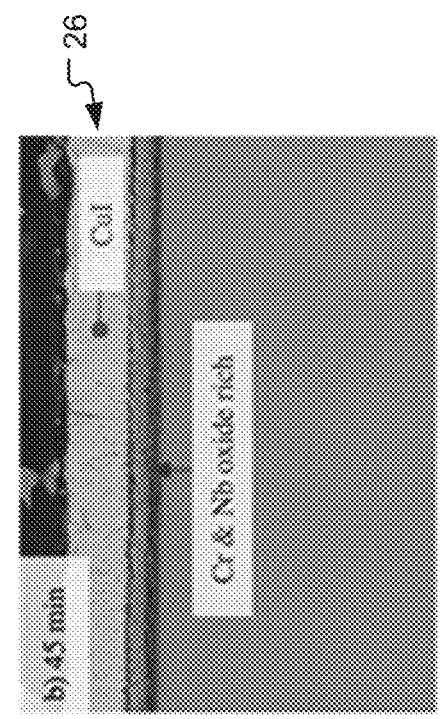
FIGS. 6A-6D are a cross-sectional image of an exemplary part after iodization at a first time, a second time, a third time, and a fourth time, respectively.
Figure 6B:
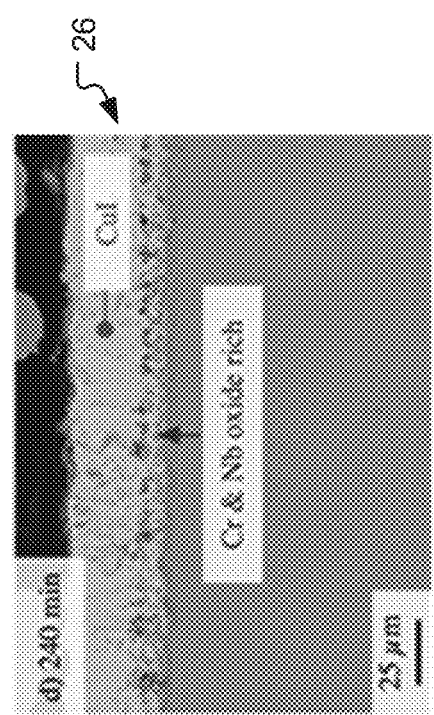
Figure 6C:
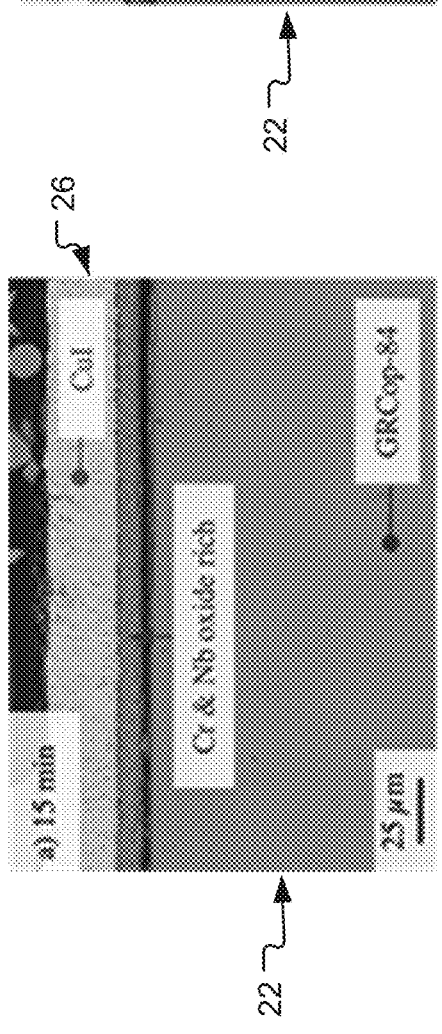
Figure 6D:
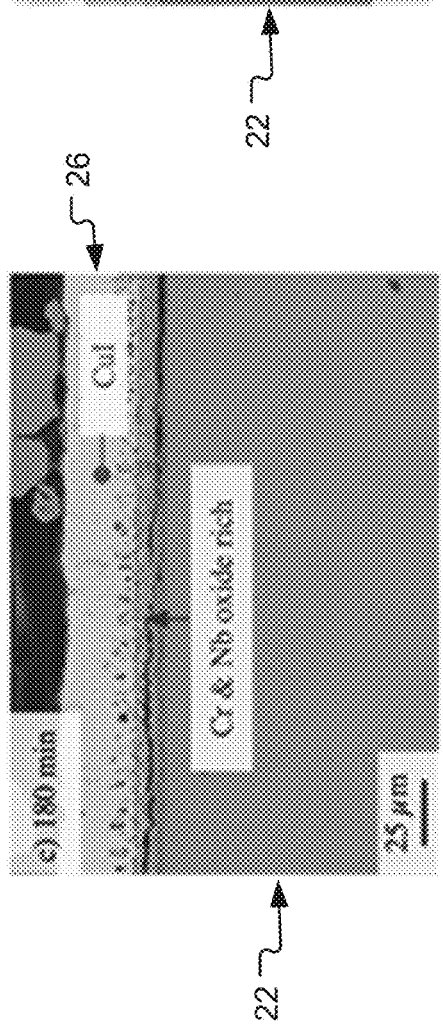
Figure 7A:
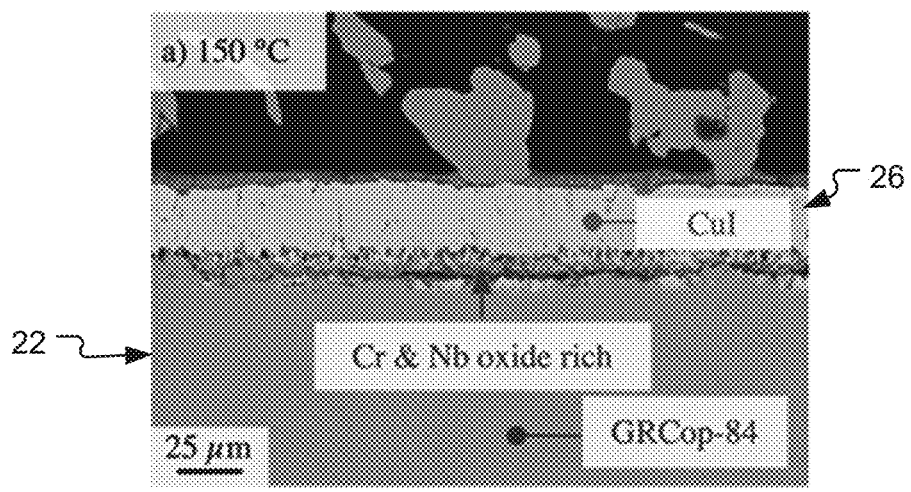
FIGS. 7A-7C are a cross-sectional image of an exemplary part after iodization at a first temperature, a second temperature, and a third temperature, respectively.
Figure 7B:
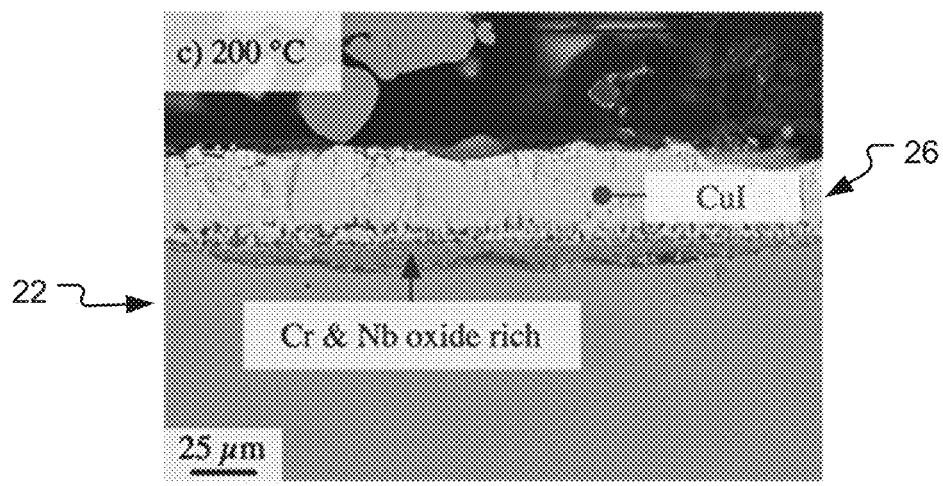
Figure 7C:
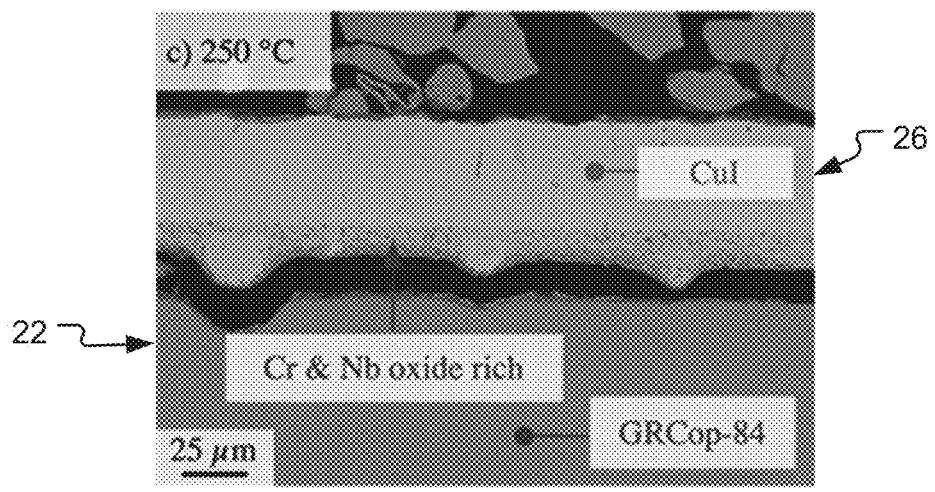

Referring to FIGS. 4A to 4D, various types of interfaces between the part material 10 and the support material 12 are provided. These embodiments show a part 10 and a support 12 where the support 12 has a composition that is less stable, or modified by a process described herein to be less stable, than the part 10 such that an etchant will dissolve the support 12. FIG. 4A shows a uniform support 12 that is completely dissolvable. FIG. 4B shows a support 12 that is present in discrete portions, and the remaining part material 10 has a porous structure that can serve a variety of purposes. FIG. 4C is a gradient dissolvable support 12 where the interface gradually changes in composition between the part 10 and the support 12 to impart beneficial material properties (strength, coefficient of thermal expansion, modulus, chemical purity, chemical resistance, etc.). The gradient also prevents the sensitizing agent from diffusing into part 10. FIG. 4D shows a part remnant support 12 where a portion of the part 10 remains intact after an etchant is applied to dissolve the support 12, and the portion can serve as a location for chemical, mechanical, and/or alloying purposes. FIG. 4D also shows how a part can be controllably thinned using the process described herein.

Referring to FIGS. 5A-5C, a schematic of a self-terminating etching process is shown. In FIG. 5A, the part 10 and the support 12 may be printed or otherwise formed. In FIG. 5B, the sensitizing agent 18 may be delivered to the part 10 and/or the support 12. In the illustrated embodiments, the sensitizing agent 18 is iodine. It will be appreciated that in other embodiments, the sensitizing agent 18 may be any other chemical. For example, the sensitizing agent may comprise, but is not limited to, elemental iodine, iodine solutions, iodine salts, iodine organics potassium iodide, povidone-iodine, iohexol, amidotrizoate, meglumine iotroxate, iopanoic acide, amiodarone, radioactive iodine, aqueous iodine, an iodine tincture, atomic iodine, or the like. As shown, the sensitizing agent 18 may be delivered in an inert environment using, for example, Argon gas. It will be appreciated that in other embodiments, the sensitizing agent 18 may be delivered using any other inert gas. In still other embodiments, the sensitizing agent 18 may be delivered without an inert gas. It will be appreciated that the sensitizing agent can be iodine in various embodiments, and the sensitizing agent can be in a solid, liquid, or vapor phase. In addition, the sensitizing agent can be delivered in elemental form or in a complex or a mixture, and the sensitized agent can be applied in a combination or sequence of phases or elements.

In some embodiments, the sensitizing agent includes a halide such as iodine or iodine complexes to sensitize, treat, and/or alter the surface of the metal component. The halide material diffuses in material of the metal component to form halide complexes in a region near the surface of the metal component. These complexes can include copper iodide, chromium iodide, niobium iodide, titanium iodide, aluminum iodide, nickel iodide, tungsten iodide, neodymium iodide, lead iodide, tin iodide, silver iodide, gold iodide, or any other metal-iodide complexes. In some embodiments, the iodine reacts with copper material to form iodine complexes in a region to a predetermined depth of the copper material. These iodine complexes are soluble in various etchants as described herein. In further embodiments, differences in the diffusion rate of the various elements within the copper material results in variations in the composition near the surface of the copper material. These post-iodized composition differences near the surface can be exploited to selectively dissolve the sensitized region under conditions that do not dissolve material of the copper.

The part 10 and the support 12 with the sensitizing agent 18 may also be heat treated during or after application of the sensitizing agent 18. In some embodiments, the part 10 and the support 12 may be heat treated between 30° C. to 900° C. In other embodiments, the part 10 and the support 12 may be heat treated at less than 30° C. or greater than 900° C. In FIG. 5C, the part 10 and the support 12 as sensitized may be selectively dissolved using an etchant such that the support 12 can be removed from the part 10. The etchant does not react with the underlying metal material and enables the process to be self-terminating, geometry agnostic, and easy to implement.

Next, an etchant is applied to the sensitized region to dissolve the sensitized region. In some embodiments, the etchant is acetonitrile, polar solvents (e.g., water, isopropanol, methanol, etc.), and/or solutions of dissolved iodide. For example, chromium (III) iodide readily dissolves in solutions containing chromium (II) iodide. Further, in some embodiments, iodine salts may added to the etchant to accelerate the etchant. The etchant is applied to the sensitized region for a time period of approximately 80 minutes to sufficiently dissolve the sensitized region but not the part. In some embodiments, the time period is between approximately 60 minutes and 80 minutes or greater than approximately 80 minutes or less than approximately 60 minutes.

Referring to FIGS. 6A to 13B, specific examples of processes of the present disclosure applied to a copper alloy are provided. It will be appreciated that though copper is described in each specific example, that the processes of the present disclosure may be applied to any metal that forms with iodine such as, but not limited to, stainless steel, Inconel, nickel base alloys (e.g., Haynes 282), titanium, or aluminum. It will also be appreciated that though the sensitizing agent is described as iodine in various examples, that the sensitizing agent may comprise, but is not limited to, a halide such as iodine or iodine complexes (e.g., copper iodide, chromium iodide, niobium iodide, iron iodide, titanium iodide, aluminum iodide, nickel iodide, tungsten iodide, neodymium iodide, lead iodide, tin iodide, silver iodide, gold iodide, or any other metal-iodide complexes), copper iodide, chromium iodide, niobium iodide, iodine solutions, iodine salts, iodine organics potassium iodide, povidone-iodine, iohexol, amidotrizoate, meglumine iotroxate, iopanoic acide, amiodarone, radioactive iodine, aqueous iodine, an iodine tincture, atomic iodine, or the like. It will be further appreciated that though the etchant is described as acetonitrile in various examples, that in other embodiments the etchant may comprise polar solvents (e.g., water, isopropanol, methanol, etc.) and/or solutions of dissolved iodide. Further, in some embodiments, iodine salts may be added to the etchant to accelerate the etchant.

Generally, the parameters used during the sensitizing of a part can be varied to produce different results. For example, the temperature and/or time period can be increased to produce a sensitized region with a greater depth. The parameters can be varied to change the processing time, the surface roughness, surface finish, feature resolution, etc. For example, in FIGS. 6A-6D, a cross-sectional image of a copper alloy 22 (e.g., GRCop-84) is shown after iodization after a first time period, a second time period, a third time period, and a fourth time period, respectively. In some embodiments, the first time period is about 15 minutes, the second time period is about 45 minutes, the third time period is about 180 minutes, and the fourth time period is about 240 minutes. It will be appreciated that in other embodiments, the first time period may be less than or greater than 15 minutes, the second time period may be less than or greater than 45 minutes, the third time period may be less than or greater than 180 minutes, and the fourth time period may be less than or greater than 240 minutes. As shown, a sensitized region 26 that comprises copper and iodine may increase in thickness with an increase in the time period. For example, the sensitized region 26 is thicker in FIG. 6D where the copper alloy 22 was iodized for 240 minutes than in FIG. 6A where the copper alloy 22 was iodized for 15 minutes. Thus, the thickness of the sensitized region 26 may be adjusted based on a time period that the copper alloy 22 is iodized for.

Similarly, the thickness of the sensitized region 26 may be adjusted based on a the temperature of the iodization process. For example, in FIGS. 7A-7C, a cross-sectional image of a copper alloy 22 (e.g., GTCop-84) is shown after iodization after a first temperature, a second temperature, and a third temperature, respectively. The first temperature is about 150° C., the second temperature is about 200° C., and the third temperature is about 250° C. It will be appreciated that in other embodiments, the first temperature may be greater than or less than 150° C., the second temperature may be greater than or less than 200° C., and the third temperature may be greater than or less than 250° C. As shown, a sensitized region 26 that comprises copper and iodine may increase in thickness with an increase in the temperature. For example, the sensitized region 26 is thicker in FIG. 6D where the copper alloy 22 was iodized for 240 minutes than in FIG. 6A where the copper alloy 22 was iodized for 15 minutes. Thus, the thickness of the sensitized region 26 may be adjusted based on a time period that the copper alloy 22 is iodized for.

Figures 8A, 8B:
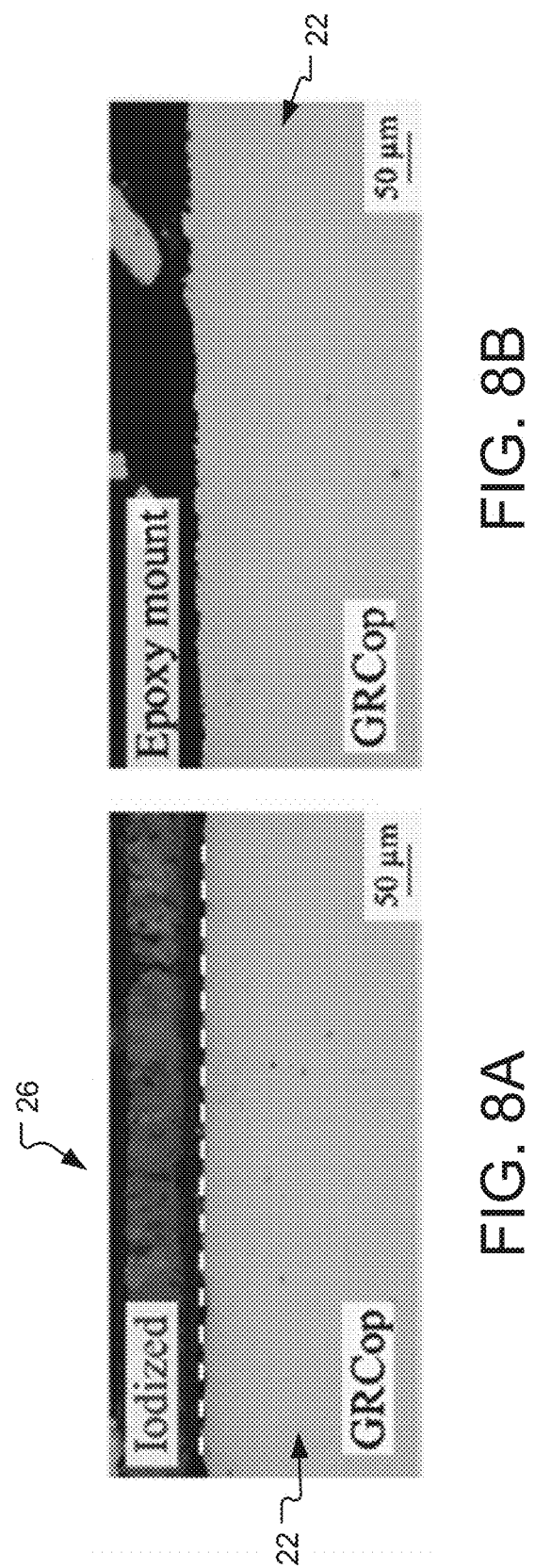
FIG. 8A is a cross-sectional view of an exemplary part that has been sensitized in accordance with an embodiment of the present disclosure.
FIG. 8B is a cross-sectional view of an exemplary part that has a sensitized region that is then dissolved in accordance with an embodiment of the present disclosure.

FIG. 8A shows a cross-section of a surface of a copper alloy 22, GRCop, that has been subjected to a sensitizing agent 18, in this case an iodine-based sensitizing agent, and forms a sensitized region 26. More specifically, the copper ally 24 has also been iodized at 150° C. for 30 minutes. FIG. 8B shows the copper alloy 22 after the copper alloy 22 has been etched at room-temperature (e.g., about 25° C.) acetonitrile for about 80 minutes.

Figure 9A:
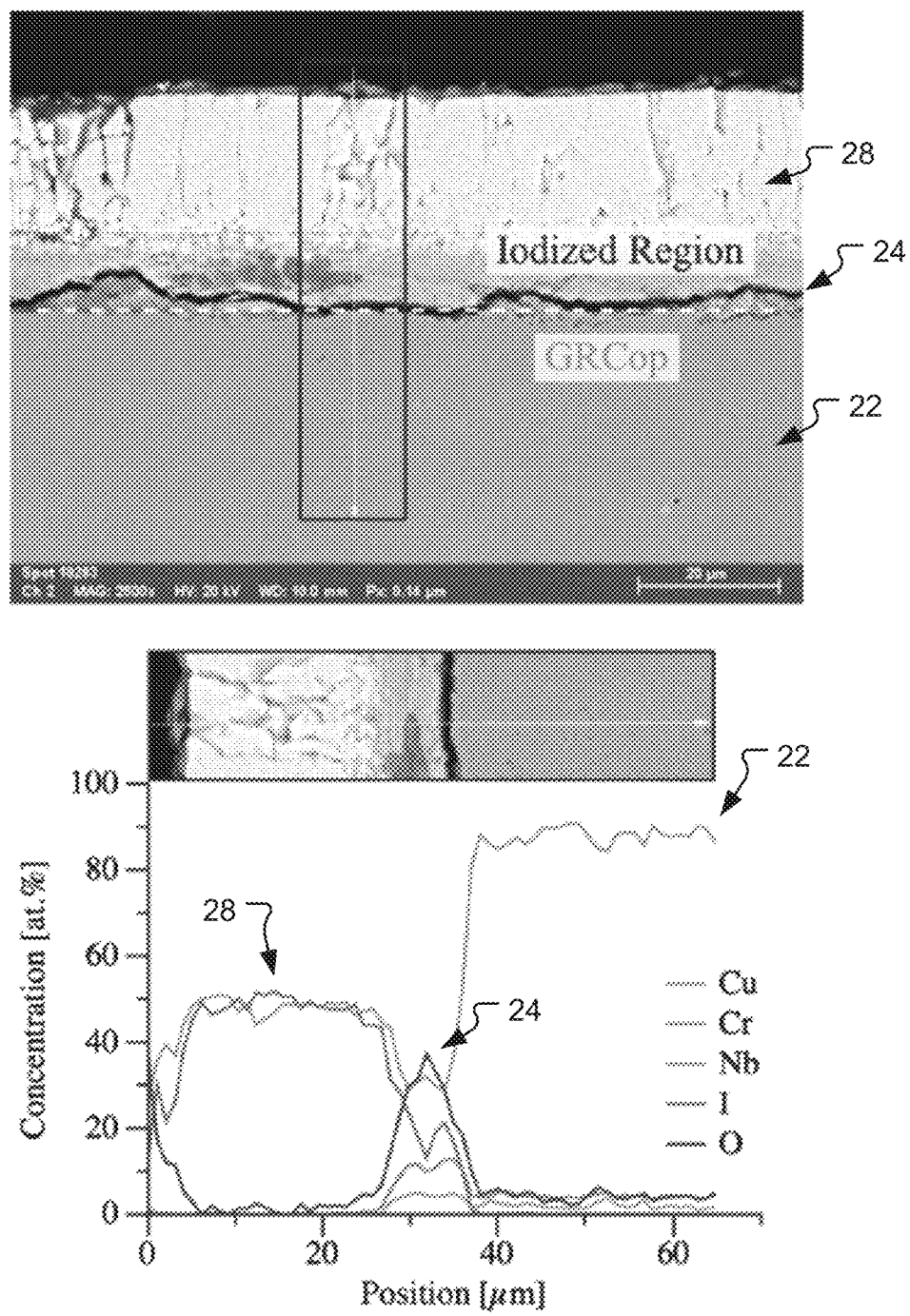
FIG. 9A is a cross-sectional view of an exemplary part that has been sensitized in accordance with an embodiment of the present disclosure.

The bottom of FIG. 9A shows the varying compositions in the different regions of the surface of a copper alloy 22 (e.g., GRCop-42) after iodization. For instance, the part material of the copper alloy 22 shown on the right has a high concentration of copper. Then, the composition moves to a transition region 24 and then to the surface of the alloy, which is a sensitized region 26 that is has copper and iodine. As described herein, the sensitized region 26 is more unstable than the other regions, and an etchant can be selected to dissolve the sensitized region 26 while not affect, or substantially affecting, the part material of the copper alloy.

Figure 9B:
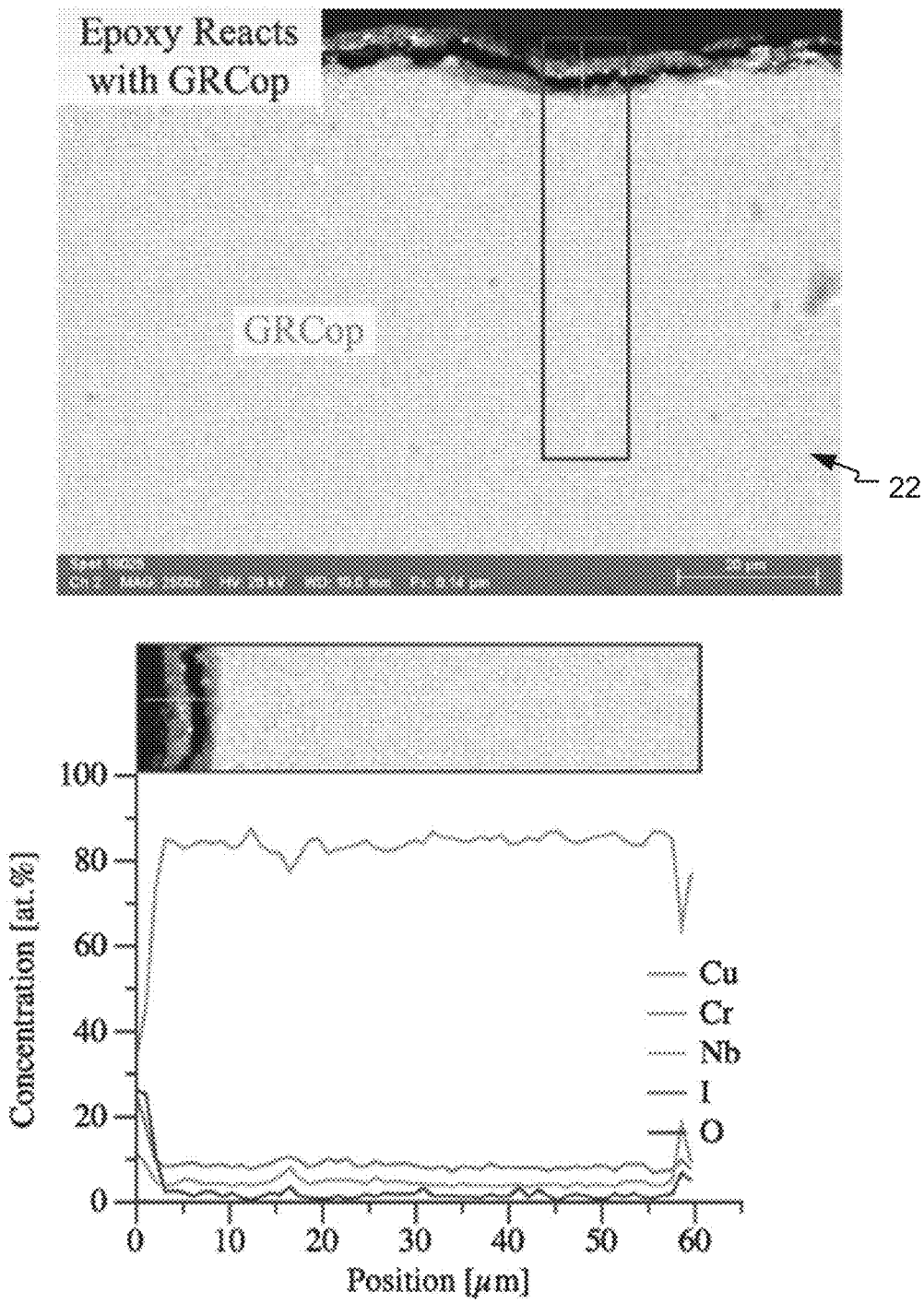
FIG. 9B is a cross-sectional view of an exemplary part that has a sensitized region that is then dissolved in accordance with an embodiment of the present disclosure.

FIG. 9B shows a copper alloy 22 (e.g., GRCop-84) that has a sensitized layer that is subsequently dissolved. In one exemplary embodiment, the copper alloy is iodized or sensitized in a tube furnace at an elevated temperature of between approximately 30 and 900° C. for a time period between approximately 20 to 1200 minutes. The terms "approximately" or "substantially" can imply a variation of +/−10% on a relative basis. In various embodiments, the elevated temperature is less than 30° C. or greater than 900° C. In some embodiments, the time period less than 20 minutes or greater than 1200 minutes. Within the tube furnace, the source of iodine may be vaporized, and argon gas flows through the tube furnace. The resulting depth of a sensitized region of iodine in the part is less than approximately 500 μm, or less than approximately 100 μm. In various embodiments, the depth is between approximately 25 and 100 μm. In some embodiments, the depth may be between approximately 0.5 μm and approximately 5,000 μm. In other embodiments, the depth may be less than 0.5 μm or greater than 5,000 μm.

In some embodiments, the copper alloy 24 may form an oxide layer 32 in addition to the sensitized region 28, as shown in FIG. 10A. In such embodiments, the copper alloy 24 part may be cleaned using sonication in addition to etching to remove the sensitized region 26 and the oxide layer 32. As shown in FIG. 10B, etching and sonication for about 10 minutes removes the sensitized region 26 and a thin layer of the oxide layer 32 may remain. As shown in FIG. 10C, etching and sonication for about 30 minutes removes the oxide layer 32 as well. Thus, in instances where an oxide layer 32 may form during ionization, sonication may be performed simultaneously with etching (or in other instances may be performed separately from etching) to remove the oxide layer 32.

In addition to dissolving a sensitized layer to separate a part and a support, the dissolution can reduce a surface roughness of the part, as shown in FIGS. 11A, 11B, 12A, and 12B. Generally, as previously described, the ionizing and etching process may be used to finish a surface of the metal component. For example, the process can be used to reduce surface roughness, remove surface defects, and/or remove trapped powder. The roughness of a surface can be expressed in terms of a $R_a$ parameter or arithmetical mean deviation of the assessed profile having the formula of $$R_a = \frac{1}{l_r} \int_0^{l_r} |z(x)| dx$$

where $l_r$ is the total horizontal length of the analyzed surface profile, and z is the vertical component of the surface and x is the horizontal component of the surface. The resulting $R_a$ parameter has a dimension typically in μm. In some embodiments, the resulting surface roughness in terms of arithmetic mean roughness, $R_a$, is less than 30 μm. In various embodiments, $R_a$ is less than 10 μm. In some embodiments, $R_a$ is less than 2 μm. It will be appreciated any other surface roughness parameter can be used, and in generally terms, embodiment of the present disclosure can reduce the surface roughness to a smaller value. For example, the roughness may be expressed in Pa which is the arithmetic average of the unfiltered raw profile.

Figure 12A:
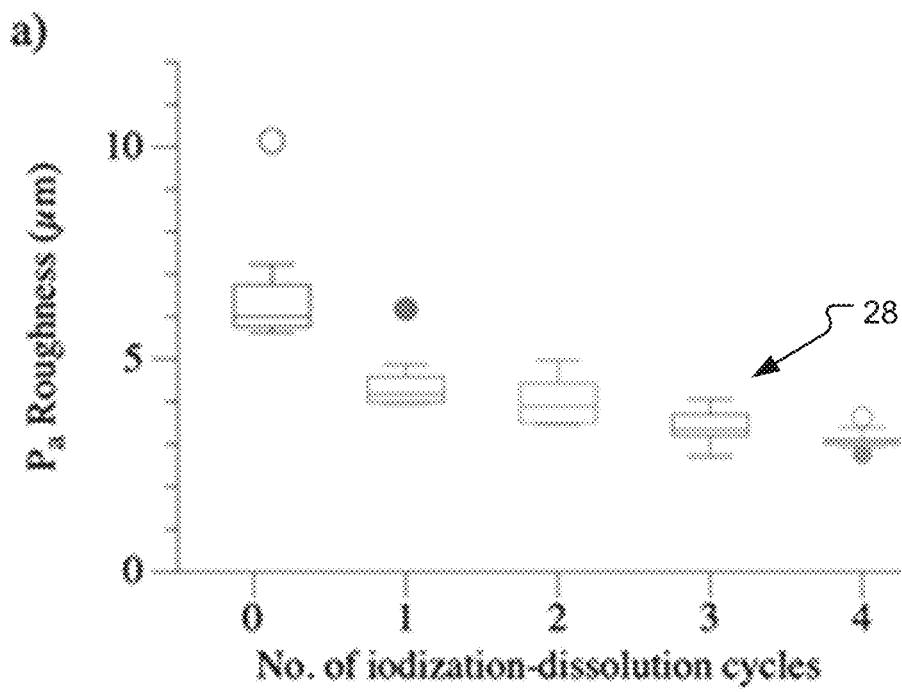
FIG. 12A is a first graph in accordance with an embodiment of the present disclosure.
Figure 12B:
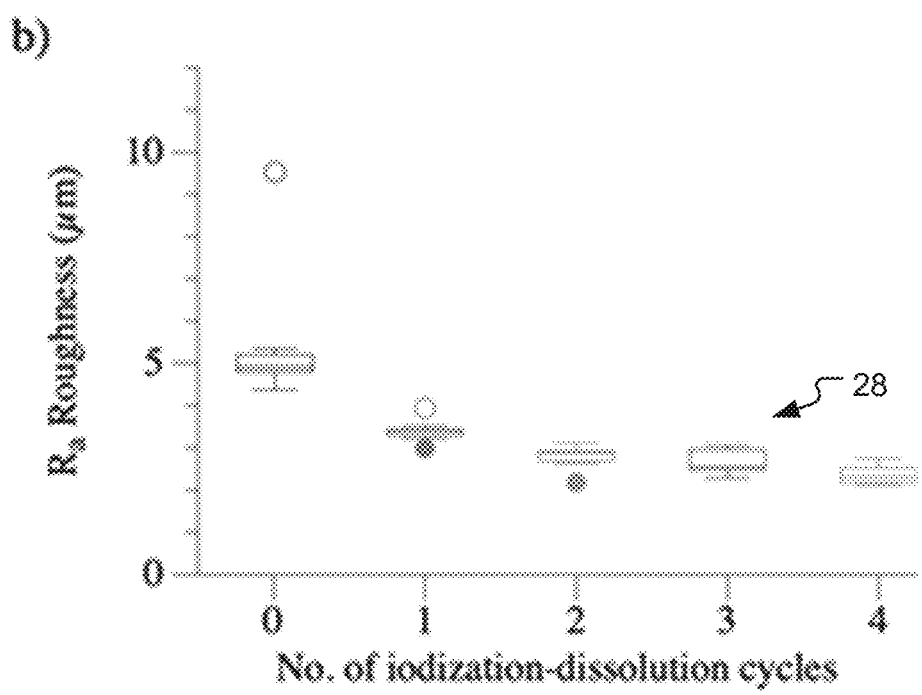
FIG. 12B is a second graph in accordance with an embodiment of the present disclosure.

As shown in FIGS. 11A-11B, a line scan of a copper alloy 24 (e.g., HT-GRCop-84) prior to and after an etching and sonication cycle are respectively shown. As illustrated, a surface 28 of the copper alloy 24 is shown as smoother after the etching and sonication cycle (shown in FIG. 11B) than the surface of the copper alloy 24 prior to the etching and sonication cycle (shown in FIG. 11A). Turning to FIGS. 12A-12B, a first graph and a second graph depict a roughness of the surface 28 based on a number of etching (e.g., iodization-dissolution) cycles. The first graph shown in FIG. 12A depicts the roughness using Pa and the second graph shown in FIG. 12B depicts the roughness using R a. As shown in both graphs, the roughness of the surface 28 decreases with at least one etching cycle.

Turning to FIGS. 13A and 13B, a first part 30A and a second part 30B are shown prior to and after processing, respectively. As shown in FIG. 13A, the first part 30A and the second part 30B prior to processing contain support structures 34A, 34B and a surface of each part 30A, 30B is rough. After applying the disclosed process (e.g., sensitization, heat treating, and etching), the support structures 34A, 34B dissolve at least partially (and may fall off), or may fully dissolve and a surface of each part 30A, 30B may be more smooth.

This process described herein can be applied to other metal alloys such as chromium alloys, niobium alloys, nickel alloys, aluminum alloys, steel alloys, or titanium alloys. In one embodiment, a process according to the present disclosure is applied to a chromium alloy, niobium alloy, nickel alloy, aluminum alloy, steel alloy, or titanium alloy. In one embodiment, a sensitizing agent is applied to an outer surface of the chromium alloy niobium alloy, nickel alloy, aluminum alloy, steel alloy, or titanium alloy at an elevated temperature between approximately 30 and 900° C. for a time period between approximately 20 minutes and approximately 1200 minutes. In some embodiments, the elevated temperature is less than 30° C. or greater than 900° C. In various embodiments, the time period is less than 20 minutes or greater than 1200 minutes. In some embodiments, the chromium alloy, niobium alloy, nickel alloy, aluminum alloy, steel alloy, or titanium alloy is dipped into the sensitizing agent, which is in a liquid state. In other embodiments, the sensitizing agent in a vapor state flows over the chromium alloy, niobium alloy, nickel alloy, aluminum alloy, steel alloy, or titanium alloy. The sensitizing agent can be iodine.

Next, an etchant is applied to the sensitized region to remove the sensitized region. In one embodiment, the etchant is acetonitrile, polar solvents, and/or solutions of dissolved iodide. This etchant dissolves the layer of iodine but not the part made of the chromium alloy, niobium alloy, nickel alloy, aluminum alloy, steel alloy, or titanium alloy. While a chemical process is described for removing the sensitized region, it will be appreciated that other processes such as vibratory polishing, scrapping, and electrochemical can remove or help remove the sensitized region. For electrochemical processes, the above-described chemical process can be combined with an electrical potential that passivates the underlying material. In addition, a corrosion inhibitor can be added to the electrolyte to further control process outputs such as surface roughness or etch time. The pH and electrolyte concentration can also be adjusted statically and dynamically to adjust process outputs.

Figure 14:
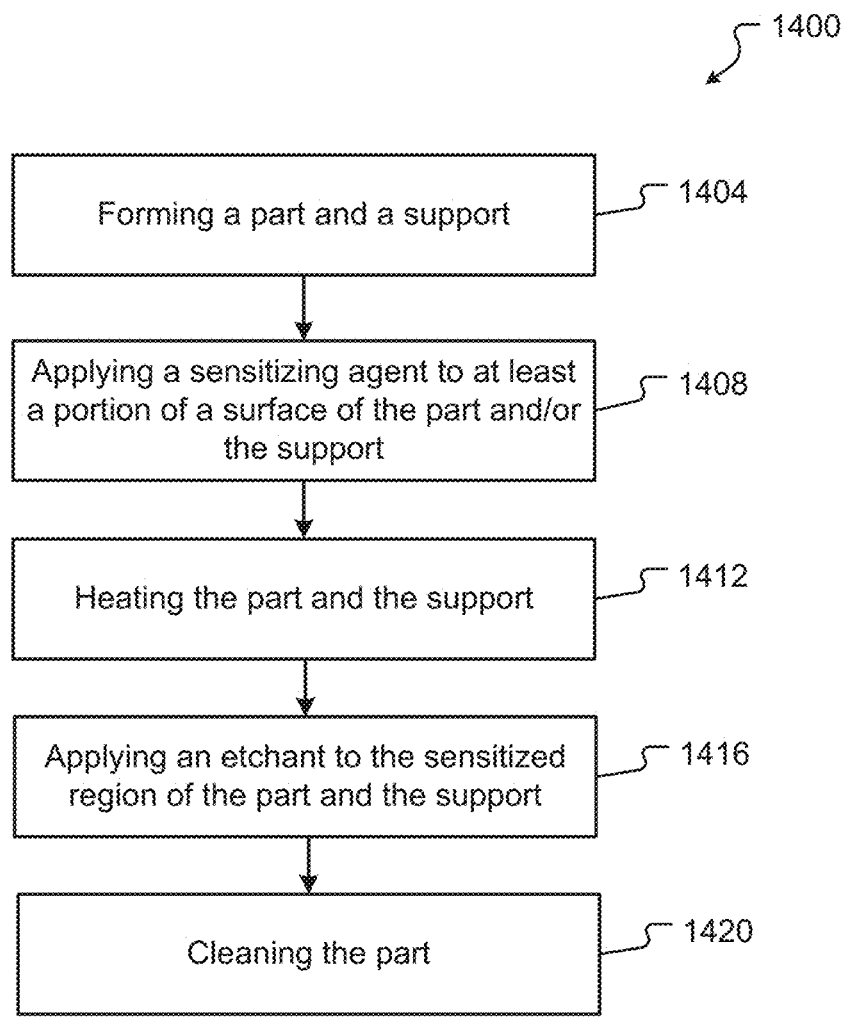
FIG. 14 is a flow chart of a method in accordance with an embodiment of the present disclosure.

Turning to FIG. 14, a method 1400 for separating a support from a part is provided.

The method 1400 may comprise forming a part and a support (step 804). The part may be the same as or similar to the part 10 and the support may be the same as or similar to the support 12. The part and the support may be formed using an additive manufacturing such as a 3D printing process. In some embodiments, the additive manufacturing process is a powder-bed 3D printer, or the additive manufacturing process may comprise powder bed sintering, selective laser sinter, selective laser melting, directed energy deposition and the like. The support may comprise a dissolvable microstructure or a mechanically weak microstructure. After the part is formed, the support can be separated from the rest of the part as described below. The part and/or the support may comprise copper or a copper alloy such as GRCop-84, GRCop-42, or an alloy that comprises copper, chromium, and/or niobium. As previously described, in other embodiments, the part and/or the support may comprise any metal that forms with iodine such as, but not limited to, stainless steel, Inconel, nickel base alloys (e.g., Haynes 282), titanium, or aluminum.

The method 1400 may comprise applying a sensitizing agent to at least a portion of a surface of the part and/or the support (step 808). The sensitizing agent may be the same as or similar to the sensitizing agent 18. The sensitizing agent when applied to a surface of the part and/or the support may change an outer layer of the part and/or the support, which may react to an etchant. As stated above, the sensitizing agent can be applied in a gaseous state, and thus, the sensitizing agent flows over the outer surface of the metal component and support. In other embodiments, the sensitizing agent can be applied in a fluid, gel, or solid state. The sensitizing agent forms a sensitized region or portion of the metal component, particularly the outer surface of the metal component. More specifically, the sensitizing agent treats, leeches, degrades, weakens, and/or alters metal material or chemical composition of the metal component. The sensitizing agent is selected to alter one or more of the chemical composition and microstructure of the metal component to make the outer layer or other part of the metal component less mechanically and/or chemically stable. In some embodiments, the sensitizing agent is applied to all of the metal component. In various embodiments, the sensitizing agent is applied to a selected portion of the metal component, such as a support.

In some embodiments, the sensitizing agent includes a halide such as iodine or iodine complexes to sensitize, treat, and/or alter the surface of the metal component. The halide material diffuses in material of the metal component to form halide complexes in a region near the surface of the metal component. As previously described, these complexes can include copper iodide, chromium iodide, niobium iodide, copper iodide, chromium iodide, niobium iodide, iron iodide, titanium iodide, aluminum iodide, nickel iodide, tungsten iodide, neodymium iodide, lead iodide, tin iodide, silver iodide, gold iodide, or any other metal-iodide complexes. In other embodiments the sensitizing agent may comprise, but is not limited to, elemental iodine, iodine solutions, iodine salts, iodine organics potassium iodide, povidone-iodine, iohexol, amidotrizoate, meglumine iotroxate, iopanoic acide, amiodarone, radioactive iodine, aqueous iodine, an iodine tincture, atomic iodine, or the like. In some embodiments, the iodine reacts with copper material to form iodine complexes in a region to a predetermined depth of the copper material. These iodine complexes are soluble in various etchants as described herein. In further embodiments, differences in the diffusion rate of the various elements within the copper material results in variations in the composition near the surface of the copper material. These post-iodized composition differences near the surface can be exploited to selectively dissolve the sensitized region under conditions that do not dissolve material of the copper material that are not sensitized by the iodine of the sensitizing agent.

The method 1400 may comprise heating the part and the support (step 812). In some embodiments, the part and the support can be baked in an oven at a temperature of between approximately 30° C. and 900° C. In other embodiments, the part and the support can be baked at an oven temperature less than 30° C. or greater than 900° C. The part and the support can be baked for a duration of between approximately 20 to 1200 minutes. In other embodiments, the support can be baked for less than 20 minutes or more than 1200 minutes. It will be appreciated that the steps 808 and 812 may occur simultaneously. In other embodiments, the step 808 and 812 may be separate steps.

The method 1400 may comprise applying an etchant to the sensitized region of the part and the support (step 816).

The etchant used to dissolve halide complexes formed in the copper material or metal material is acetonitrile, polar solvents, and/or solutions of dissolved iodide. For example, chromium (III) iodide readily dissolves in solutions containing chromium (II) iodide. Further, in some embodiments, iodine salts may added to the etchant to accelerate the etchant. The etchant may be applied at, for example, room temperature (e.g., 25° C.). In other embodiments, the etchant may be applied at less than or greater than room temperature. The etchant may be applied for about 80 minutes. In other instances, the etchant may be applied for less than or greater than 80 minutes.

The method 1400 may comprise cleaning the part (step 820). The part may be cleaned using an ultrasonic bath or sonication. The part may be cleaned using sonication in a fluid such as water or acetonitrile. In some embodiments, sonication may be applied to the part between about 10 minutes and about 30 minutes. In other embodiments, sonication may be applied to the part for less than 10 minutes or more than 30 minutes. Sonication may beneficially aid in removing oxidation from the part.

The step 820 may occur simultaneously with the step 816. In other instances, the step 820 may occur as a separate step from the step 816. It will be appreciated that in some embodiments, the method 1400 may not include the step 820.

Again, various parameters described herein can be varied to change the processes described herein as well as the resulting surface of the part. For example, changing one or more of the iodine source, the elevated temperature and/or time period for the heat treatment and sensitizing, and electrochemical parameters such as electric potential, current, and/or frequency can change the processing time, depth of removal, the surface roughness and the post-etch cleanliness of the part.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

To provide additional background, context, and to further satisfy the written description requirements of 35 U.S.C. § 112, the following references are incorporated by reference herein in their entireties:

PCT Pub. WO 2018/013178A1;
PCT Pub. WO 2017/143005A1;
PCT Pub. WO 2017143013A1;
Lefky, C. S., Zucker, B., Nassar, A. R., Simpson, T. W., Hildreth, O., "Impact of Compositional Gradients on Selectivity of Dissolvable Support Structures for Directed Energy Deposited Metals", Acta Materialia 2018, 153, 1-7;
Lefky, C. S., Nassar, A. R., Simpson, T. W., Hildreth, O., "Dissolvable Metal Supports for Printed Metal Parts. In; Austin, 2016, pp. 1-10;
Lefky, C. S., Zucker, B., Wright, D., Nassar, A. R., Simpson, T. W., Hildreth, O., "Dissolvable Supports in Powder Bed Fusion-Printed Stainless Steel. 3D Printing and Additive Manufacturing," 2017, 4, 3-11;
Lefky, C. S., Nassar, A. R., Simpson, T. W., Hildreth, O., Dissolvable Metal Supports for Printed Metal Parts. In; 2016; pp. 1-7;
Hildreth, O., Nassar, A. R., Chasse, K. R., "Dissolvable Metal Supports for 3D Direct Metal Printing," 3D Printing and Additive Manufacturing 2016, 3, 91-97; and
Izumi, T., Yoshioka, T., Hayashi, S., Narita, T., "Sulfidation Properties of TiAl-2 at. % X (X=v, Fe, Co, Cu, Nb, Mo, Ag and W) Alloys at 1173 K and 1.3 Pa Magnesium Pressure in an H2S—H-2 Gas Mixture," Intermetallics 200, 8, 891-901.

What is claimed is:

1. A self-terminating process for removing a sensitized region of a material, comprising:
    applying a sensitizing agent to a surface of the material, wherein the material comprises a metal material, and the sensitizing agent comprises a halide material in a gaseous state;
    heating the material at an elevated temperature between approximately 30 and 900° C. to cause the sensitizing agent to diffuse into the material and create the sensitized region in the material adjacent to the surface; and
    applying an etchant to the sensitized region to dissolve and remove the sensitized region of the material.

2. The process of claim 1, wherein the metal material comprises at least one of a copper, a chromium, a niobium, a stainless steel material, an Inconel material, a nickel based alloy, a titanium material, or an aluminum material.

3. The process of claim 1, wherein the heating is conducted for between approximately 20 and 1200 minutes.

4. The process of claim 1, wherein the sensitized region has a depth between approximately 10 and 200 μm.

5. The process of claim 1, wherein the material is a part and a support joined at a connection having a separation dimension from an outer perimeter of the connection, wherein the sensitized region has a depth that is greater than or equal to the separation dimension.

6. The process of claim 5, wherein the connection has a cross section with a circular shape, and the separation dimension is a radius of the circular shape.

7. The process of claim 5, wherein the material further includes the part and a second support joined at a second connection that has a second separation dimension from an outer perimeter of the second connection, wherein the second separation dimension is larger than the separation dimension, and the sensitized region has a depth that is greater than or equal to the second separation dimension such that dissolution of the sensitized region separates the second support from the part.

* * * * *